United States Patent [19]

Toyokura et al.

[11] Patent Number: 5,596,518

[45] Date of Patent: Jan. 21, 1997

[54] ORTHOGONAL TRANSFORM PROCESSOR

[75] Inventors: Masaki Toyokura, Hyogo; Kiyoshi Okamoto; Yoshifumi Matsumoto, both of Osaka, all of Japan

[73] Assignee: Matsushita Electric Industrial Co., Ltd., Osaka, Japan

[21] Appl. No.: 434,298

[22] Filed: May 3, 1995

[30] Foreign Application Priority Data

| May 10, 1994 | [JP] | Japan | 6-096196 |
| Nov. 1, 1994 | [JP] | Japan | 6-268701 |

[51] Int. Cl.[6] .................................................. G06F 17/14
[52] U.S. Cl. ............................................................. 364/725
[58] Field of Search .................................. 364/725, 726, 364/727

[56] References Cited

U.S. PATENT DOCUMENTS

| 4,791,598 | 12/1988 | Liou et al. | 364/725 |
| 5,181,183 | 1/1993 | Miyazaki | 364/725 |
| 5,291,429 | 3/1994 | Iwama et al. | 364/725 |
| 5,331,585 | 7/1994 | Tanaka et al. | 364/725 |
| 5,477,478 | 12/1995 | Okamoto et al. | 364/725 |
| 5,528,528 | 6/1996 | Bui | 364/725 |

Primary Examiner—Roy N. Envall, Jr.
Assistant Examiner—Emmanuel L. Moise
Attorney, Agent, or Firm—McDermott, Will & Emery

[57] ABSTRACT

Stored in each of four coefficient memories are eight elements of each row of a matrix in 4 rows and 8 columns, which matrix consists of absolute values of elements of upper four rows out of an inverse discrete cosine matrix in 8 rows and 8 columns to be subjected to an 8-point IDCT processing. An input element $y_{ij}$ is supplied in parallel to four multipliers. Each of the four multipliers executes multiplication of an output of the corresponding coefficient memory out of the four coefficient memories, by the input element $y_{ij}$. Eight accumulators are disposed for executing, in parallel, accumulation for obtaining eight inner products using results of the four multipliers while restoring signs of the coefficients of the orthogonal transform matrix. An 8-input selector is disposed for successively selecting results of the eight accumulators to supply an inner product $w_{ij}$ corresponding to the input element $y_{ij}$.

20 Claims, 22 Drawing Sheets

FIG.1

$$\begin{pmatrix} Y_{0j} \\ Y_{1j} \\ Y_{2j} \\ Y_{3j} \\ Y_{4j} \\ Y_{5j} \\ Y_{6j} \\ Y_{7j} \end{pmatrix} = \begin{pmatrix} t_0 & t_1 & t_2 & t_3 & t_4 & t_5 & t_6 & t_7 \\ t_0 & t_3 & t_6 & -t_7 & -t_4 & -t_1 & -t_2 & -t_5 \\ t_0 & t_5 & -t_6 & -t_1 & -t_4 & t_7 & t_2 & t_3 \\ t_0 & t_7 & -t_2 & -t_5 & t_4 & t_3 & -t_6 & -t_1 \\ t_0 & -t_7 & -t_2 & t_5 & t_4 & -t_3 & -t_6 & t_1 \\ t_0 & -t_5 & -t_6 & t_1 & -t_4 & -t_7 & t_2 & -t_3 \\ t_0 & -t_3 & t_6 & t_7 & -t_4 & t_1 & -t_2 & t_5 \\ t_0 & -t_1 & t_2 & -t_3 & t_4 & -t_5 & t_6 & -t_7 \end{pmatrix} \begin{pmatrix} W_{0j} \\ W_{1j} \\ W_{2j} \\ W_{3j} \\ W_{4j} \\ W_{5j} \\ W_{6j} \\ W_{7j} \end{pmatrix}$$

$$\begin{pmatrix} Y_{1j} \\ Y_{2j} \\ Y_{3j} \\ Y_{5j} \\ Y_{6j} \\ Y_{7j} \end{pmatrix} = \begin{pmatrix} t_7 & t_5 & t_3 & t_1 & -t_1 & -t_3 & -t_5 & -t_7 \\ t_6 & -t_2 & -t_2 & t_6 & t_6 & -t_2 & -t_2 & t_6 \\ t_5 & -t_1 & t_7 & t_3 & -t_3 & -t_7 & t_1 & -t_5 \\ t_3 & -t_7 & -t_1 & t_5 & t_5 & -t_1 & -t_7 & t_3 \\ t_2 & -t_6 & -t_6 & t_2 & t_2 & -t_6 & -t_6 & t_2 \\ t_1 & -t_3 & t_5 & -t_7 & -t_7 & t_5 & -t_3 & t_1 \end{pmatrix} \begin{pmatrix} \omega_{0j} \\ \omega_{1j} \\ \omega_{2j} \\ \omega_{3j} \\ \omega_{4j} \\ \omega_{5j} \\ \omega_{6j} \\ \omega_{7j} \end{pmatrix}$$

$$
\begin{pmatrix} \omega_{0j}+\omega_{7j} \\ \omega_{1j}+\omega_{6j} \\ \omega_{2j}+\omega_{5j} \\ \omega_{3j}+\omega_{4j} \\ \omega_{0j}-\omega_{7j} \\ \omega_{1j}-\omega_{6j} \\ \omega_{2j}-\omega_{5j} \\ \omega_{3j}-\omega_{4j} \end{pmatrix} = \frac{1}{2}\begin{pmatrix} 0 & t_6 & 0 & 0 & t_2 & 0 \\ 0 & -t_2 & 0 & 0 & t_6 & 0 \\ 0 & t_2 & 0 & 0 & -t_6 & 0 \\ 0 & -t_6 & 0 & 0 & -t_2 & 0 \\ t_1 & 0 & -t_3 & t_5 & 0 & t_1 \\ -t_3 & 0 & -t_7 & t_1 & 0 & t_3 \\ t_5 & 0 & t_1 & t_7 & 0 & t_5 \\ -t_7 & 0 & -t_5 & -t_3 & 0 & t_7 \end{pmatrix} \begin{pmatrix} Y_{1j} \\ Y_{2j} \\ Y_{3j} \\ Y_{5j} \\ Y_{6j} \\ Y_{7j} \end{pmatrix}
$$

FIG. 20A

$$\begin{pmatrix} \omega_{0j}+\omega_{7j} \\ \omega_{1j}+\omega_{6j} \\ \omega_{2j}+\omega_{5j} \\ \omega_{3j}+\omega_{4j} \end{pmatrix} = \frac{1}{2} \begin{pmatrix} t_2 & t_6 \\ t_6 & -t_2 \\ -t_6 & t_2 \\ -t_2 & -t_6 \end{pmatrix} \begin{pmatrix} y_{2j} \\ y_{6j} \end{pmatrix} = \begin{pmatrix} \rho_{0j} \\ \rho_{1j} \\ \rho_{2j} \\ \rho_{3j} \end{pmatrix}$$

FIG. 20B

$$\begin{pmatrix} \omega_{0j}-\omega_{7j} \\ \omega_{1j}-\omega_{6j} \\ \omega_{2j}-\omega_{5j} \\ \omega_{3j}-\omega_{4j} \end{pmatrix} = \frac{1}{2} \begin{pmatrix} t_1 & t_5 & t_3 & t_7 \\ t_3 & t_1 & -t_7 & -t_5 \\ t_5 & -t_7 & -t_1 & t_3 \\ t_7 & -t_3 & t_5 & -t_1 \end{pmatrix} \begin{pmatrix} y_{1j} \\ y_{3j} \\ y_{5j} \\ y_{7j} \end{pmatrix} = \begin{pmatrix} \sigma_{0j} \\ \sigma_{1j} \\ \sigma_{2j} \\ \sigma_{3j} \end{pmatrix}$$

ORTHOGONAL TRANSFORM PROCESSOR

BACKGROUND OF THE INVENTION

The present invention relates to an orthogonal transform processor to be suitably utilized for an image processing.

A small-size circuit for achieving an orthogonal transform is recently required as an important part of a system of compressing and coding two-dimensional image data with a high degree of efficiency. In an encoder, there is utilized a forward orthogonal transform such as a discrete cosine transform which is referred to DCT, a discrete sine transform which is referred to DST, or the like. In a decoder, there is utilized an inverse orthogonal transform such as an inverse discrete cosine transform which is referred to IDCT, an inverse discrete sine transform which is referred to as IDST, or the like.

U.S. Pat. No. 4,791,598 discloses a two-dimensional DCT processor comprising two one-dimensional DCT processors and a transposition memory interposed therebetween. Each of the two one-dimensional DCT processors incorporates a distributed arithmetic (DA) circuit for obtaining vector inner products using ROMs (read only memory) without multipliers used. The DA circuit comprises a plurality of ROMs and accumulators which are referred to RACs. Each of the RACs comprises (i) a ROM which contains, in a form of a look-up table, the partial sums of vector inner products based on a discrete cosine matrix, and (ii) an accumulator for adding, with the digits aligned, the partial sums successively retrieved from the ROM with the bit slice words serving as addresses, thereby to obtain the vector inner product corresponding to an input vector. Such an arrangement of the two-dimensional DCT processor can be applied to a two-dimensional IDCT processor.

It is now supposed to execute a two-dimensional IDCT processing on an input data comprising 8×8 elements. The input data is expressed by a matrix Y in 8 rows and 8 columns having elements $y_{ij}$ (i=0 to 7, j=0 to 7). Also, there is considered an inverse discrete cosine matrix D in 8 rows and 8 columns. Each of elements $d_{ij}$ of the matrix D is expressed as follows;

$d_{i0}=1/(2 \cdot 2^{0.5})$, $i$=0 to 7

$d_{ij}=(\frac{1}{2})\cos\{(2i+1)j\pi/16\}$, $i$=0 to 7, $j$=1 to 7 \hfill (1)

The two-dimensional IDCT of the matrix Y is a $DYD^T$, wherein $D^T$ refers to a transposition matrix of the matrix D. When there are used a transposing means and a one-dimensional IDCT processor for calculating the one-dimensional IDCT of the matrix Y or matrix product DY, an intermediate matrix $X=(DY)^T$ can readily be obtained. The final result $DYD^T$ can also be obtained in a similar manner, because $DYD^T$ is equal to $(D(DY)T)^T=(DX)^T$. More specifically, the one-dimensional IDCT processor for calculating the matrix product DY, plays an important role for achieving a two-dimensional IDCT.

The result of a one-dimensional IDCT on the jth column of the matrix Y is expressed by the jth column of a matrix W in 8 rows and 8 columns. Here, each element $w_{ij}$ of the matrix W is expressed as follows:

$w_{ij}=\Sigma_{k=0}^{7} d_{ik}y_{kj}$, $i$=0 to 7, $j$=0 to 7 \hfill (2)

The element $w_{ij}$ is the inner product of the ith row of the matrix D and the jth column of the matrix Y, and is equal to the sum of eight products. The processing for obtaining the element $w_{ij}$ is called an 8-point IDCT processing.

According to a one-dimensional IDCT processor having eight multipliers and eight accumulators, there can be calculated in parallel eight inner products $w_{0j}$, $w_{1j}$, $w_{2j}$, $w_{3j}$, $w_{4j}$, $w_{5j}$, $w_{6j}$, $w_{7j}$ which form the jth column of the matrix W, wherein $w_{0j}=\Sigma_{k=0}^{7} d_{0k}y_{kj}$ $w_{1j}=\Sigma_{k=0}^{7} d_{1k}y_{kj}$ $w_{2j}=\Sigma_{k=0}^{7} d_{2k}y_{kj}$ $w_{3j}=\Sigma_{k=0}^{7} d_{3k}y_{kj}$ $w_{4j}=\Sigma_{k=0}^{7} d_{4k}y_{kj}$ $w_{5j}=\Sigma_{k=0}^{7} d_{5k}y_{kj}$ $w_{6j}=\Sigma_{k=0}^{7} d_{6k}y_{kj}$ $w_{7j}=\Sigma_{k=0}^{7} d_{7k}y_{kj}$ \hfill (3)

The one-dimensional IDCT processor having eight multipliers above-mentioned is disadvantageous in that the multipliers occupy a large area on the chip when the processor is mounted on a VLSI (very large scale integration).

Further, to achieve, by the prior art DA circuit, a parallel calculation of eight inner products represented by the equations (3), large-size ROMs are disadvantageously required.

SUMMARY OF THE INVENTION

It is an object of the present invention to reduce, in circuit size, an orthogonal transform processor such as a one-dimensional IDCT processor.

To achieve the object above-mentioned, a first orthogonal transform processor according to the present invention is arranged to reduce the number of the multipliers in view of the regularity of the elements of an inverse discrete cosine matrix or an inverse discrete sine matrix, such that the result of each multiplier is distributed into a plurality of accumulators. According to this orthogonal transform processor, the multipliers required for an 8-point IDCT processing for example is reduced in number to 4 or 3 while eight multipliers are required in prior art.

In a second orthogonal transform processor according to the present invention, each of a plurality of inner-product calculations is divided into two constant multiplications and one partial-inner-product calculation, and the two constant multiplications are executed by a constant multiplier circuit. Further, a plurality of partial-inner-product calculations are executed in parallel by a DA circuit. According to this orthogonal transform processor, only one or two multipliers in the constant multiplier circuit are required. Further, since a portion of the inner-product calculations is executed by the constant multiplier circuit, the DA circuit is reduced in ROM size.

BRIEF DESCRIPTION OF THE DRAWINGS

FIG. 1 is a view illustrating a matrix operation to be executed by an IDCT processor according to the present invention;

FIG. 10 is a view of a portion of the matrix operation in FIG. 1;

FIG. 19 is a view illustrating a matrix operation introduced from FIG. 10;

FIG. 20A and FIG. 20B are views illustrating two matrix operations divided from the matrix operation in FIG. 19;

FIG. 23 is a view illustrating the inside arrangement of one of the 2-bit input RACs, shown in FIG. 21, for executing the matrix operation in FIG. 20A.

DETAILED DESCRIPTION OF THE INVENTION

The following description will discuss a one-dimensional IDCT processor according to each of embodiments of the present invention with reference to the attached drawings.

First Embodiment

First, $t_n$ (n=0 to 7) is defined as follows;

$$t_0 = 1/(2 \cdot 2^{0.5})$$

$$t_n = (\tfrac{1}{2})\cos(n\pi/16), \ n=1 \text{ to } 7 \tag{4}$$

Then, the calculation of eight inner products represented by the equations (3), is expressed as shown in FIG. 1 with the symmetry of cosine function utilized.

Figure 2:
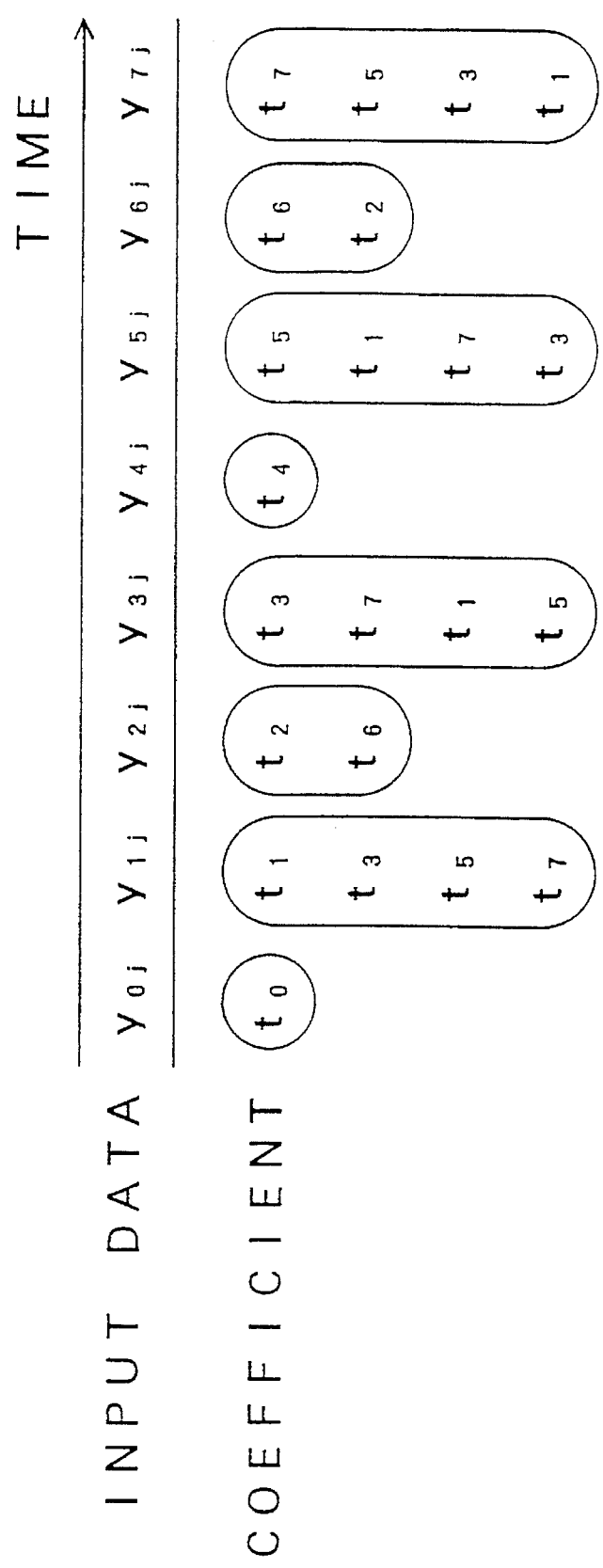
FIG. 2 is a view illustrating one procedure according to which the matrix operation in FIG. 1 is executed.
Figure 3:
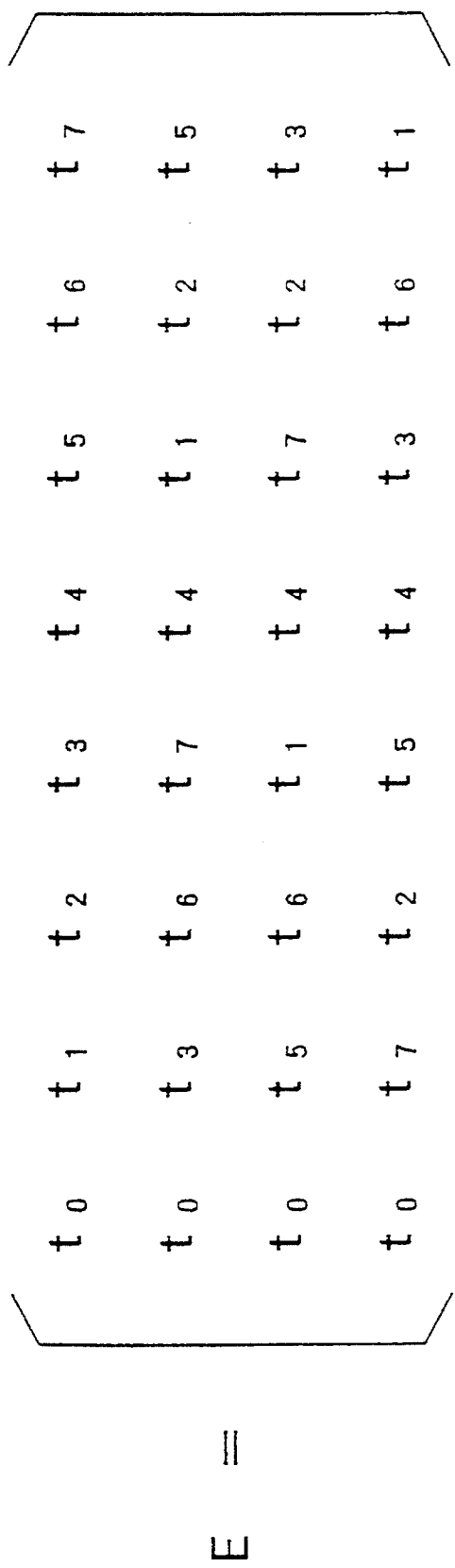
FIG. 3 is a view of an coefficient matrix used in the procedure in FIG. 2.

In the matrix operation in FIG. 1, when the sign (±) is disregarded, the coefficient by which $y_{0j}$ is multiplied, is $t_0$, the coeffficients by which $y_{1j}$ is multiplied, are $t_1, t_3, t_5, t_7$, the coefficients by which $y_{2j}$ is multiplied, are $t_2, t_6$, the coefficients by which $y_{3j}$ is multiplied, are $t_3, t_7, t_1, t_5$, the coefficient by which $y_{4j}$ is multiplied, is $t_4$, the coefficients by which $y_{5j}$ is multiplied, are $t_5, t_1, t_7, t_3$, the coefficients by which $y_{6j}$ is multiplied, are $t_6, t_2$, and the coefficients by which $y_{7j}$ is multiplied, are $t_7, t_5, t_3, t_1$. Accordingly, when eight elements $y_{ij}$ (i=0 to 7) of an input data are successively supplied, as shown in FIG. 2, it is sufficient to execute maximum four multiplications for one cycle. FIG. 3 shows a coefficient matrix E used in the procedure in FIG. 2. The coefficient matrix E is a matrix in 4 rows and 8 columns using, as component elements, the absolute values of the respective elements of the 0th to 3rd rows out of the inverse discrete cosine matrix in 8 rows and 8 columns in FIG. 1.

Figure 4:
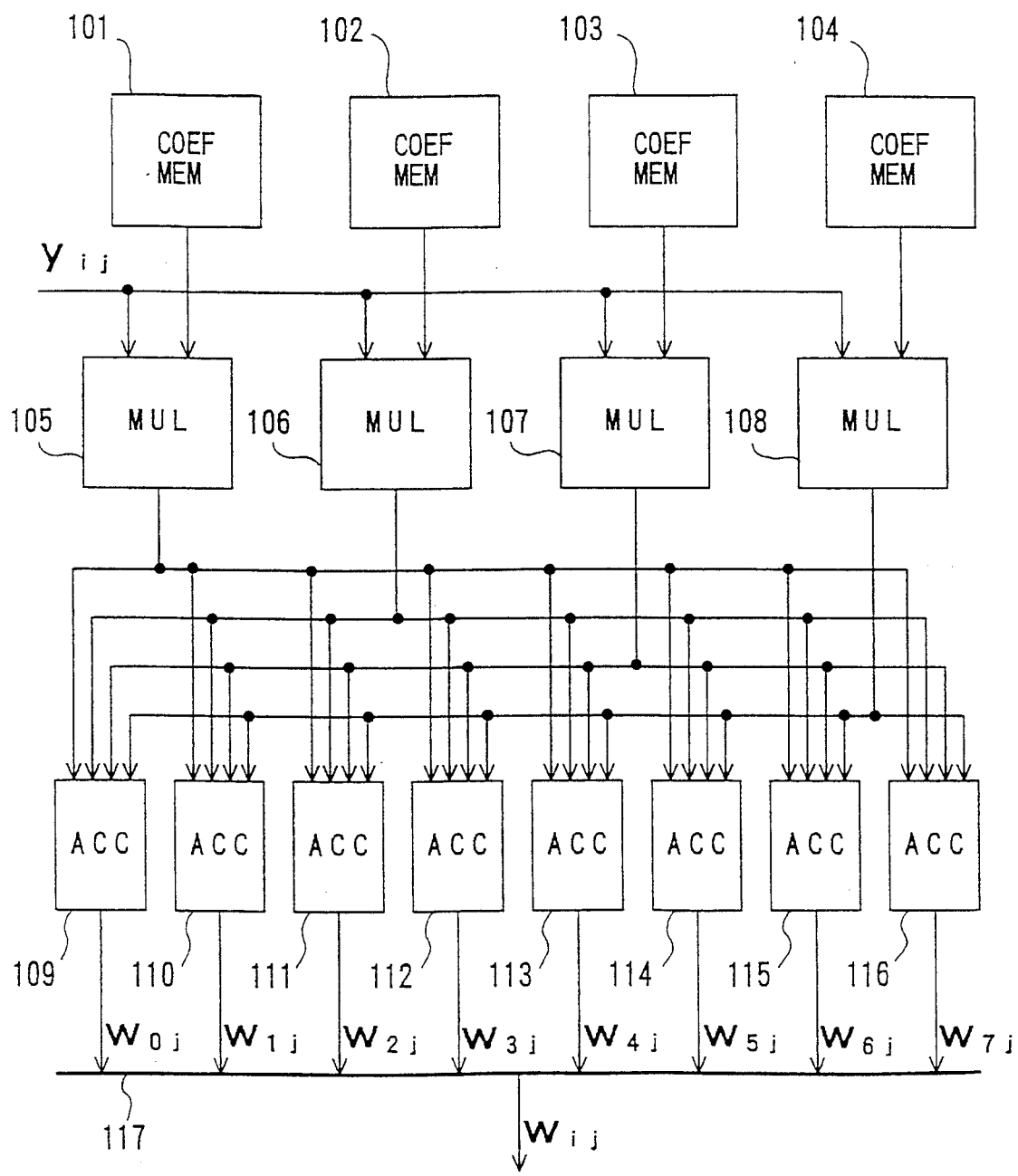
FIG. 4 is a view of the arrangement of an IDCT processor according to a first embodiment of the present invention, employing the coefficient matrix in FIG. 3.

FIG. 4 shows the arrangement of the one-dimensional IDCT processor according to a first embodiment of the present invention. This arrangement uses the coefficient matrix E in FIG. 3. Shown in FIG. 4 are first to fourth coefficient memories 101 to 104, first to fourth multipliers 105 to 108, first to eighth accumulators 109 to 116, and an 8-input selector 117. The first coefficient memory 101 contains eight elements on the 0th row of the matrix E, the second coefficient memory 102 contains eight elements on the first row of the matrix E, the third coefficient memory 103 contains eight elements on the second row of the matrix E, and the fourth coefficient memory 104 contains eight elements on the third row of the matrix E. From an input terminal, binary number data $y_{ij}$ (i=0 to 7, j=0 to 7) expressed in terms of 2's complements, are supplied to the first to fourth multipliers 105 to 108 in the order of $y_{00}$ to $y_{70}, y_{01}$ to $y_{71}, \ldots, y_{07}$ to $y_{77}$. The first multiplier 105 is arranged to execute multiplication of $y_{ij}$ by the output of the first coefficient memory 101, the second multiplier 106 is arranged to execute multiplication of $y_{ij}$ by the output of the second coefficient memory 102, the third multiplier 107 is arranged to execute multiplication of $y_{ij}$ by the output of the third coefficient memory 103, and the fourth multiplier 108 is arranged to execute multiplication of $y_{ij}$ by the output of the fourth coefficient memory 104. The first to eighth accumulators 109 to 116 are arranged to execute, in parallel, accumulations for obtaining eight inner products $w_{0j}, w_{1j}, w_{2j}, w_{3j}, w_{4j}, w_{5j}, w_{6j}, w_{7j}$, with the use of the results of the first to fourth multipliers 105 to 108. The 8-input selector 117 is arranged to successively select the results of the first to eighth accumulators 109 to 116 and to supply data $w_{ij}$ (i=0 to 7, j=0 to 7) in the order of $w_{00}$ to $w_{70}, w_{01}$ to $w_{71}, \ldots, w_{07}$ to $w_{77}$.

Figure 5:
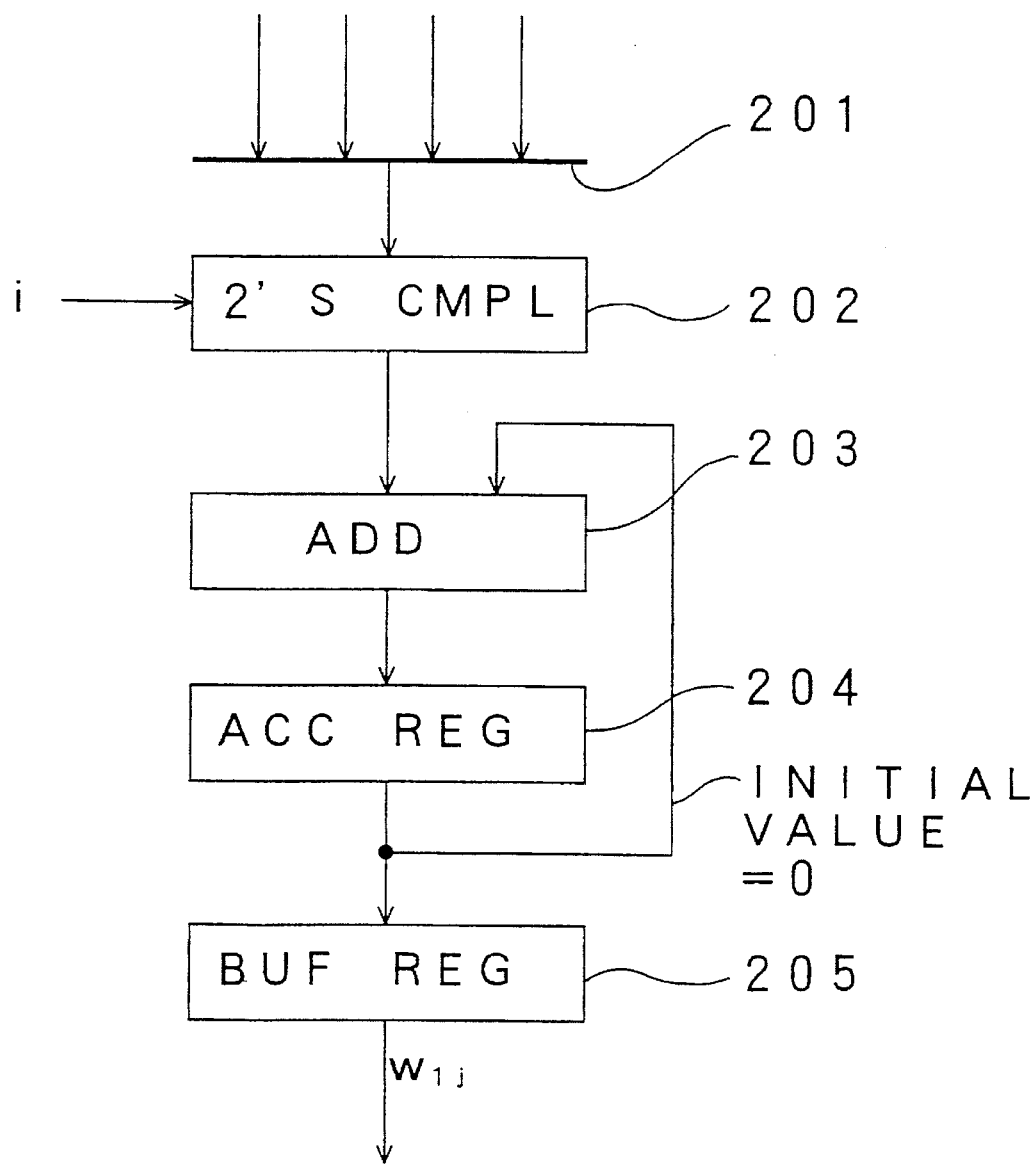
FIG. 5 is a view illustrating the inside arrangement of one of the accumulators in FIG. 4.

FIG. 5 shows the inside arrangement of the accumulator 110 for obtaining $w_{1j}$ in FIG. 4. Shown in FIG. 5 are a 4-input selector 201, a 2's complementer 202, an adder 203, an accumulation register 204, and a buffer register 205. The 4-input selector 201 is arranged to select one of the results of the first to fourth multipliers 105 to 108. The 2's complementer 202 is arranged such that, dependent on the value of i, the output of the 4-input selector 201 is passed therethrough as it is, or the 2's complement of the output of the 4-input selector 201 is supplied. More specifically, the 2's complementer 202 is controlled such that, according to the calculation of the inner product $w_{1j}$ of the first row ($t_0, t_3, t_6, -t_7, -t_4, -t_1, -t_2, -t_5$) out of the inverse discrete cosine matrix in FIG. 1 and an input data vector ($y_{0j}$, $y_{1j}$, $y_{2j}$, $y_{3j}$, $y_{4j}$, $y_{5j}$, $y_{6j}$, $y_{7j}$), the output of the 4-input selector 201 is passed therethrough as it is at the cycle where i is equal to 0, 1, 2, and the 2' complement of the output of the 4-input selector 201 is supplied at the cycle where i is equal to 3, 4, 5, 6, 7. The 2's complement of a data x is obtained by inverting all the bits of the data x and adding 1 thereto. The adder 203 is arranged to obtain the sum of the result of the 2's complementer 202 and the retention output of the accumulation register 204. The retention contents of the accumulation register 204 are previously initialized to 0 and rewritten by the result of the adder 203. The buffer register 205 is arranged to maintain the output of the accumulation register 204, thereby to assure a pipeline operation of the one-dimensional IDCT processor. Each of other accumulators in FIG. 4 has an arrangement similar to that shown in FIG. 5.

With reference to FIGS. 4 and 5, the following description will discuss the operation of the one-dimensional IDCT processor according to the first embodiment of the present invention.

At the first cycle, a data $y_{00}$ is supplied from the input terminal. On the other hand, $t_0$, $t_0$, $t_0$, $t_0$ are read from the coefficient memories 101 to 104, respectively, and four products $t_0y_{00}$, $t_0y_{00}$, $t_0y_{00}$, $t_0y_{00}$ are calculated in parallel by the multipliers 105 to 108. Then, results of the four multipliers 105 to 108 are selected by the 4-input selectors 201 of the accumulators 109 to 116. In this case, since the results of the four multipliers 105 to 108 are the same, any result may be selected. The 2's complementer 202 of each of the accumulators 109 to 116 is arranged such that the output of the corresponding 4-input selector 201 is passed therethrough as it is. The adder 203 of each of the accumulators 109 to 116 calculates the sum of the result of the corresponding 2's complementer 202 and the output of the corresponding accumulation register 204 which has previously been initialized to 0, and the addition result is written into the corresponding accumulation register 204. As a result, the same product $t_0y_{00}$ is stored in all the accumulation registers 204 of the accumulators 109 to 116.

At the second cycle, a data $y_{10}$ is supplied from the input terminal. On the other hand, $t_1$, $t_3$, $t_5$, $t_7$ are read out from the coefficient memories 101 to 104, respectively, and four products $t_1y_{10}$, $t_3y_{10}$, $t_5y_{10}$, $t_7y_{10}$ are calculated in parallel by the multipliers 105 to 108. Then, results of the four multipliers 105 to 108 are selected by the 4-input selectors 201 of the accumulators 109 to 116. In this case, the result $t_1y_{10}$ of the first multiplier 105 is selected in the first accumulator 109, the result $t_3y_{10}$ of the second multiplier 106 is selected in the second accumulator 110, the result $t_5y_{10}$ of the third multiplier 107 is selected in the third accumulator 111, the result $t_7y_{10}$ of the fourth multiplier 108 is selected in the fourth accumulator 112, the result $t_7y_{10}$ of the fourth multiplier 108 is selected in the fifth accumulator 113, the result $t_5y_{10}$ of the third multiplier 107 is selected in the sixth accumulator 114, the result $t_3y_{10}$ of the second multiplier 106 is selected in the seventh accumulator 115, and the result $t_1y_{10}$ of the first multiplier 105 is selected in the eighth accumulator 116. The 2's complementer 202 of each of the first to fourth accumulators 109 to 112 is arranged such that the output of the corresponding 4-input selector 201 is passed therethrough as it is. The 2's complementer 202 of each of the fifth to eighth accumulators 113 to 116 is arranged to supply the 2's complement of the output of the corresponding 4-input selector 201. The adder 203 of each of the accumulators 109 to 116 calculates the sum of the result of the corresponding 2's complementer 202 and the output of the corresponding accumulation register 204, and the addition result is written into the accumulation register 204. As a result, $t_0y_{00}+t_1y_{10}$ is stored in the accumulation register 204 of the first accumulator 109, $t_0y_{00}+t_3y_{10}$ is stored in the accumulation register 204 of the second accumulator 110, $t_0y_{00}+t_5y_{10}$ is stored in the accumulation register 204 of the third accumulator 111, $t_0y_{00}+t_7y_{10}$ is stored in the accumulation register 204 of the fourth accumulator 112, $t_0y_{00}-t_7y_{10}$ is stored in the register 204 of the fifth accumulator 113, $t_0y_{00}-t_5y_{10}$ is stored in the accumulation register 204 of the sixth accumulator 114, $t_0y_{00}-t_3y_{10}$ is stored in the accumulation register 204 of the seventh accumulator 115, and $t_0y_{00}-t_1y_{10}$ is stored in the accumulation register 204 of the eighth accumulator 116.

At the third to eighth cycles, data $y_{20}$, $y_{30}$, $y_{40}$, $y_{50}$, $y_{60}$, $y_{70}$ are successively supplied from the input terminal. Accordingly, at the end of the eighth cycle, eight inner products $w_{00}$, $w_{10}$, $w_{20}$, $w_{30}$, $w_{40}$, $w_{50}$, $w_{60}$, $w_{70}$ are stored in the accumulation registers 204 of the accumulators 109 to 116.

At the ninth cycle, a data $y_{01}$ is supplied from the input terminal. A processing similar to that at the first cycle is executed, and the retention contents $w_{00}$, $w_{10}$, $w_{20}$, $w_{30}$, $w_{40}$, $w_{50}$, $w_{60}$, $w_{70}$ of the accumulation registers 204 of the accumulators 109 to 116, are transferred to the buffer registers 205, respectively. The 8-input selector 117 selectively supplies the output $w_{00}$ of the first accumulator 109.

At the tenth cycle, a data $y_{11}$ is supplied from the input terminal, and a processing similar to that at the second cycle is executed. The 8-input selector 117 selectively supplies the output $w_{10}$ of the second accumulator 110.

Then, by repeating operations similar to those above-mentioned, there are continuously obtained output data $w_{00}$ to $w_{70}$, $w_{01}$ to $w_{71}$, . . . , $w_{07}$ to $w_{77}$ corresponding to the input data $y_{00}$ to $y_{70}$, $y_{01}$ to $y_{71}$, $y_{07}$ to $y_{77}$ which are continuously supplied.

Figure 6:
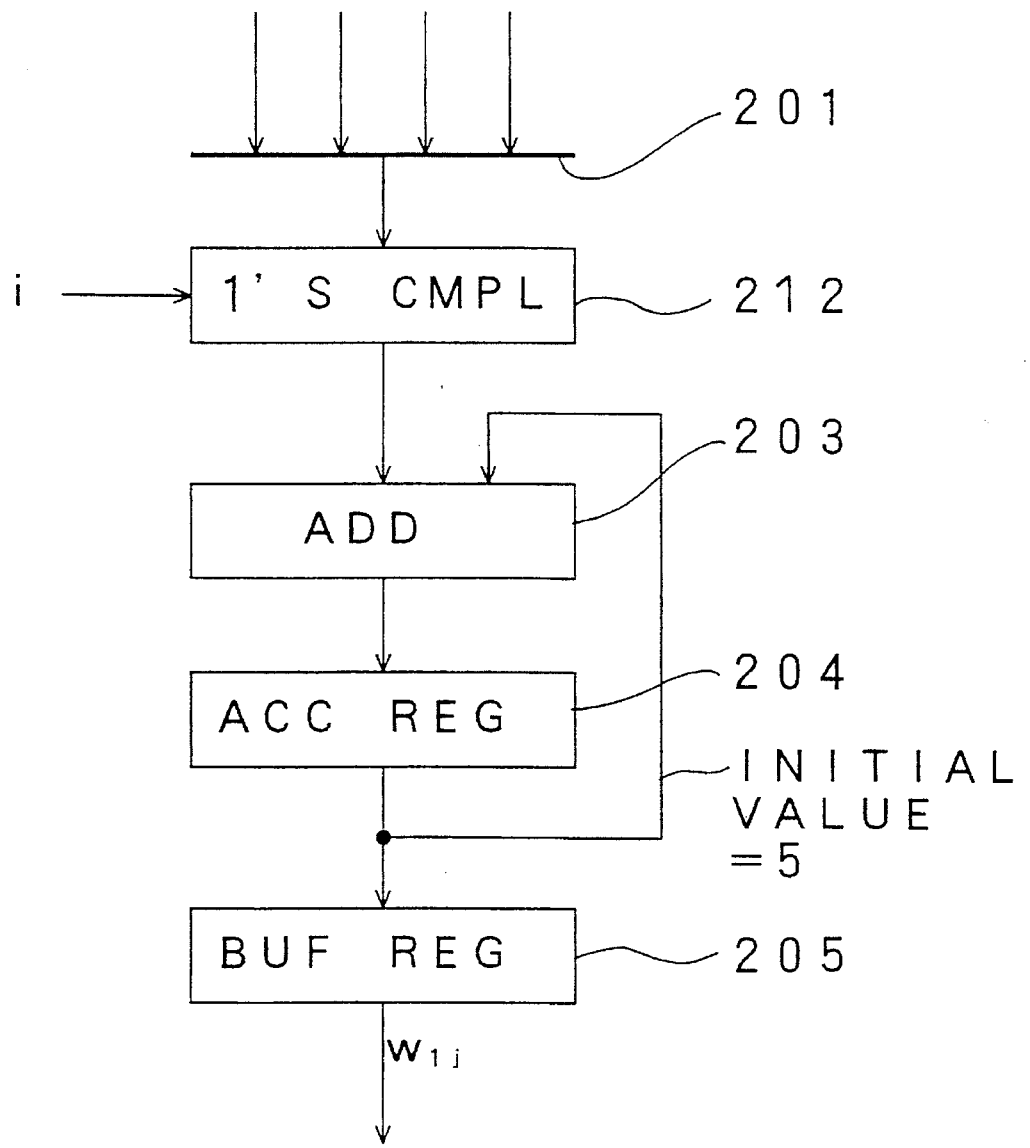
FIG. 6 is a view of a modification of the accumulator in FIG. 5.

A modification of the accumulator 110 in FIG. 5 is shown in FIG. 6, in which a 1's complementer 212 is used instead of the 2's complementer 202. The 1's complementer 212 is arranged such that, dependent on the value of i above-mentioned, the output of the 4-input selector 201 is passed therethrough as it is, or the 1's complement of the output of the 4-input selector 201 is supplied. More specifically, the 1's complementer 212 is controlled such that, according to the calculation of the inner product $w_{ij}$ of the first row ($t_0$, $t_3$, $t_6$, $-t_7$, $-t_4$, $-t_1$, $-t_2$, $-t_5$) out of the inverse discrete cosine matrix in FIG. 1 and an input data vector ($y_{0j}$, $y_{1j}$, $y_{2j}$, $y_{3j}$, $y_{4j}$, $y_{5j}$, $y_{6j}$, $y_{7j}$), the output of the 4-input selector 201 is passed therethrough as it is at the cycle where i is equal to 0, 1, 2, and the 1' complement of the output of the 4-input selector 201 is supplied at the cycle where i is equal to 3, 4, 5, 6, 7. The 1's complement of a data x is obtained by inverting all the bits of the data x. The initial value of the accumulation register 204 is set to the number of negative elements out of the eight elements forming the first row of the inverse discrete cosine matrix, namely five.

As thus discussed, according to the first embodiment, there can be realized a one-dimensional IDCT processor in which the number of multipliers is reduced to 4. It is noted that fixed wirings may be adopted with the 4-input selectors 201 of the accumulators 109 to 116 (FIGS. 5 and 6) omitted. In such an arrangement, only the result of the first multiplier 105 is supplied to the first and eighth accumulators 109, 116, only the result of the second multiplier 106 is supplied to the second and seventh accumulators 110, 115, only the result of the third multiplier 107 is supplied to the third and sixth accumulators 111, 114, and only the result of the fourth multiplier 108 is supplied to the fourth and fifth accumulators 112, 113.

Second Embodiment

Figure 7:
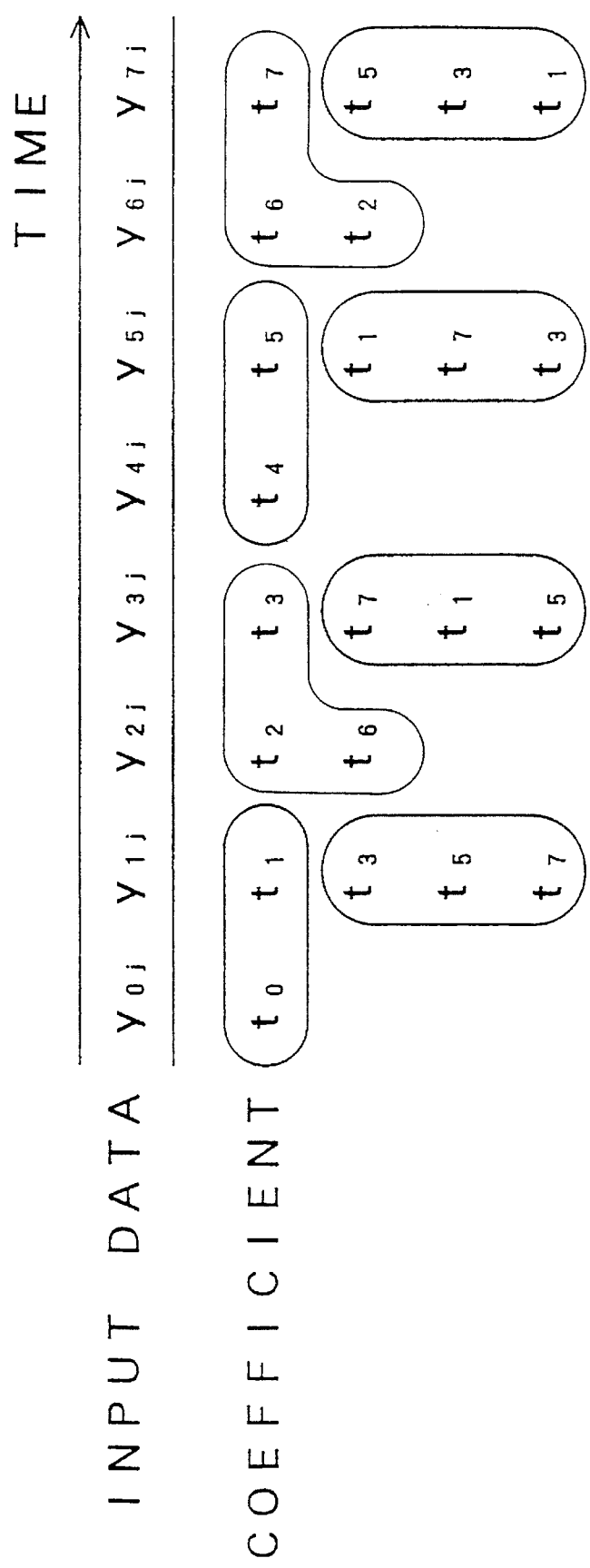
FIG. 7 is a view illustrating another procedure according to which the matrix operation in FIG. 1 is executed.
Figure 8:
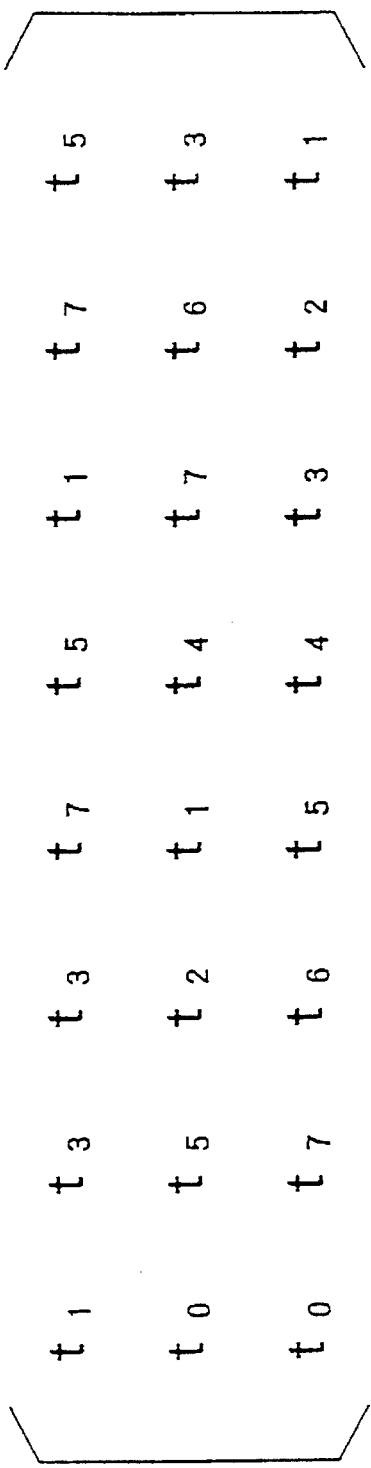
FIG. 8 is a view of an coefficient matrix used in the procedure in FIG. 7.

To achieve the matrix operation in FIG. 1, it is required to execute 22 multiplications in eight cycles as shown in FIG. 2. The average number of multiplications in one cycle is 2.75. A second embodiment of the present invention is arranged such that, when eight elements $y_{ij}$ (i=0 to 7) of an input data are successively supplied, as shown in FIG. 7, maximum three multiplications are executed in one cycle. In this connection, there is disposed a register for holding input elements such that not only the input elements at a certain cycle but also the input elements at the previous cycle can be utilized. More specifically, there are executed (i) multiplications of first-group coefficients $t_1$, $t_0$ by elements $y_{1j}$, $y_{0j}$ at a certain cycle, (ii) multiplications of second-group coefficients $t_3$, $t_5$, $t_7$ by an element $y_{ij}$ at the next cycle, (iii) multiplications of third-group coefficients $t_3$, $t_2$, $t_6$ by elements $y_{3j}$, $y_{2j}$ at the further next cycle, (iv) multiplications of fourth-group coefficients $t_7$, $t_1$, $t_5$ by an element $y_{3j}$ at the another next cycle, (v) multiplications of fifth-group coefficients $t_5$, $t_4$ by elements $y_{5j}$, $y_{4j}$ at the still further next cycle, (vi) multiplications of sixth-group coefficients $t_i$, $t_7$, $t_3$ by an element $y_{5j}$ at the still another next cycle, (vii) multiplications of seventh-group coefficients $t_7$, $t_6$, $t_2$ by elements $y_{7j}$, $y_{6j}$ at the yet further next cycle, and (viii) multiplications of eighth-group coefficients $t_5$, $t_3$, $t_1$ by an element $y_{7j}$ at the yet another next cycle. FIG. 8 shows a coefficient matrix G used in the procedure in FIG. 7. The coefficient matrix G is a matrix in 3 rows and 8 columns comprising the 0th column having three coefficients $t_1$, $t_0$, $t_0$ including the first-group coefficients above-mentioned, the first column having the second-group coefficients $t_3$, $t_5$, $t_7$ above-mentioned, the second column having the third-group coefficients $t_3$, $t_2$, $t_6$ above-mentioned, the third column having the fourth-group coefficients $t_7$, $t_1$, $t_5$ above-mentioned, the fourth column having three coefficients $t_5$, $t_4$, $t_4$ including the fifth-group coefficients above-mentioned, the fifth column having the sixth-group coefficients $t_1$, $t_7$, $t_3$ above-mentioned, the sixth column having the seventh-group coefficients $t_7$, $t_6$, $t_2$ above-mentioned, and the seventh column having the eighth-group coefficients $t_5$, $t_3$, $t_1$ above-mentioned.

Figure 9:
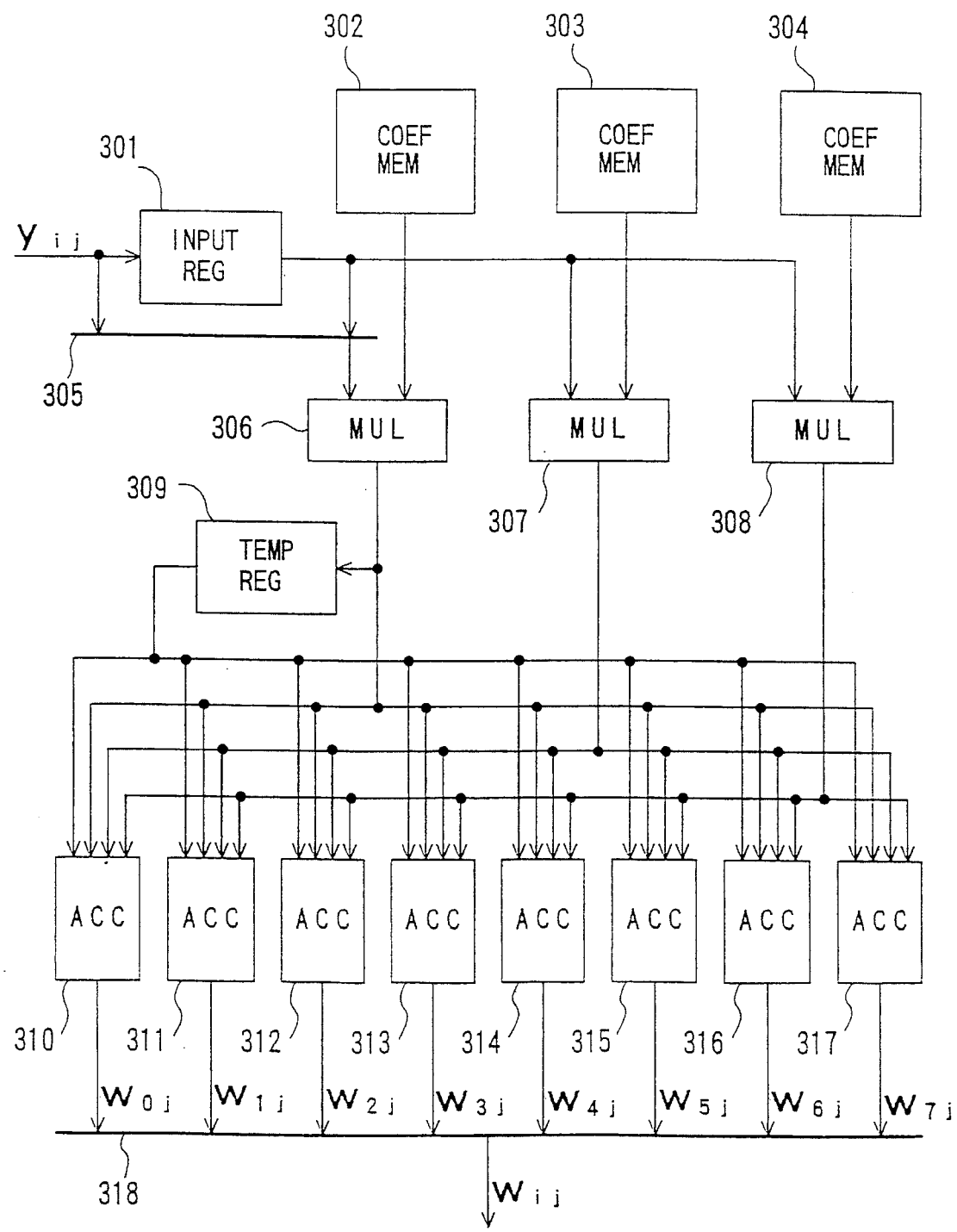
FIG. 9 is a view of the arrangement of an IDCT processor according to a second embodiment of the present invention, employing the coefficient matrix in FIG. 8.

FIG. 9 shows the arrangement of a one-dimensional IDCT processor according to the second embodiment of the present invention. Shown in FIG. 9 are an input register 301, first to third coefficient memories 302 to 304, a 2-input selector 305, first to third multipliers 306 to 308, a temporary register 309, first to eighth accumulators 310 to 317, and an 8-input selector 318. The first coefficient memory 302 contains eight elements on the 0th row of the matrix G, the second coefficient memory 303 contains eight elements on the first row of the matrix G, and the third coefficient memory 304 contains eight elements on the second row of the matrix G. From an input terminal, binary number data $y_{ij}$ (i=0 to 7, j=0 to 7) expressed in terms of 2's complements, are supplied to the input register 301 and the 2-input selector 305 in the order of $y_{00}$ to $y_{70}$, $y_{01}$ to $y_{71}$, ..., $y_{07}$ to $y_{77}$. The 2-input selector 305 is arranged to select either the data supplied directly from the input terminal or the output data of the input register 301. The first multiplier 306 is arranged to execute multiplication of the output of the 2-input selector 305 by the output of the first coefficient memory 302, the second multiplier 307 is arranged to execute multiplication of the output of the input register 301 by the output of the second coefficient memory 308, and the third multiplier 308 is arranged to execute multiplication of the output of the input register 301 by the output of the second coefficient memory 304. The temporary register 309 is arranged to temporarily hold the output of the first multiplier 306. The first to eighth accumulators 310 to 317 are arranged to execute, in parallel, accumulations for obtaining eight inner products $w_{0j}$, $w_{1j}$, $w_{2j}$, $w_{3j}$, $w_{4j}$, $w_{5j}$, $w_{6j}$, $w_{7j}$ with the use of the output data of the temporary register 309 and the results of the first to third multipliers 306 to 308. Each of the first to eighth accumulators 310 to 317 has the arrangement as shown in FIG. 5 or 6. The 8-input selector 318 is arranged to successively select the results of the first to eighth accumulators 310 to 317 and to supply data $w_{ij}$ (i=0 to 7, j=0 to 7) in the order of $w_{00}$ to $w_{70}$, $w_{01}$ to $w_{71}$, ..., $w_{07}$ to $w_{77}$.

With reference to FIGS. 9 and 5, the following description will discuss the operation of the one-dimensional IDCT processor according to the second embodiment of the present invention.

At the first cycle, a data $y_{00}$ is supplied from the input terminal. Further, at the end of the first cycle, the data $y_{00}$ is written in the input register 301.

At the second cycle, a data $y_{10}$ is supplied from the input terminal, and this data $y_{10}$ is selected by the 2-input selector 305. On the other hand, $t_1$, $t_0$, $t_0$ are read out from the coefficient memories 302 to 304, respectively, and three products $t_1y_{10}$, $t_0y_{00}$, $t_0y_{00}$ are calculated in parallel by the multipliers 306 to 308. Then, one of the results of the second and third multipliers 307, 308 is selected by each of the 4-input selectors 201 of the accumulators 310 to 317. In this case, since the results of the second and third multipliers 307, 308 are the same, any result may be selected. The 2's complementer 202 of each of the accumulators 310 to 317 is arranged such that the output of the corresponding 4-input selector 201 is passed therethrough as it is. The adder 203 of each of the accumulators 310 to 317 calculates the sum of the result of the corresponding 2's complementer 202 and the result of the corresponding accumulation register 204 previously initialized to 0, and the addition result is written into the corresponding accumulation register 204. Accordingly, the same product $t_0y_{00}$ is stored in the accumulation registers 204 of the accumulators 310 to 317. Further, at the end of the second cycle, the data $y_{10}$ is written into the input register 301 and the result $t_1y_{10}$ of the first multiplier 306 is written into the temporary register 309.

At the third cycle, a data $y_{20}$ is supplied from the input terminal. The 2-input selector 305 selects the output data $y_{10}$ of the input register 301. On the other hand, $t_3$, $t_5$, $t_7$ are read out From the coefficient memories 302 to 304, respectively, and three products $t_3y_{10}$, $t_5y_{10}$, $t_7y_{10}$ are calculated in parallel by the multipliers 306 to 308. Then, one of the output data of the temporary register 309 and the results of the three multipliers 306, 307, 308, is selected by each of the 4-input selectors 201 of the accumulators 310 to 317. In this case, the output data $t_1y_{10}$ of the temporary register 309 is selected in the first accumulator 310, the result $t_3y_{10}$ of the first multiplier 306 is selected in the second accumulator 311, the result $t_5y_{10}$ of the second multiplier 307 is selected in the third accumulator 312, the result $t_7y_{10}$ of the third multiplier 308 is selected in the fourth accumulator 313, the result $t_7y_{10}$ of the third multiplier 308 is selected in the fifth accumulator 314, the result $t_5y_{10}$ of the second multiplier 307 is selected in the sixth accumulator 315, the result $t_3y_{10}$ of the first multiplier 306 is selected in the seventh accumulator 316, and the output data $t_1y_{10}$ of the temporary register 309 is selected in the eighth accumulator 317. The 2's complementer 202 of each of the first to fourth accumulators 310 to 313 is arranged such that the output of the corresponding 4-input selector 201 is passed therethrough as it is. The 2's complementer 202 of each of the fifth to eighth accumulators 314 to 317 is arranged to supply the 2's complement of the output of the corresponding 4-input selector 201. The adder 203 of each of the accumulators 310 to 317 calculates the sum of the result of the corresponding 2's complementer 202 and the output of the corresponding accumulation register 204, and the addition result is written into the corresponding accumulation register 204. As a result, $t_0y_{00}+t_1y_{10}$ is stored in the accumulation register 204 of the first accumulator 310, $t_0y_{00}+t_3y_{10}$ is stored in the accumulation register 204 of the second accumulator 311, $t_0y_{00}+t_5y_{10}$ is stored in the accumulation register 204 of the third accumulator 312, $t_0y_{00}+t_7y_{10}$ is stored in the accumulation register 204 of the fourth accumulator 313, $t_0y_{00}-t_7y_{10}$ is stored in the accumulation register 204 of the fifth accumulator 314, $t_0y_{00}-t_5y_{10}$ is stored in the accumulation register 204 of the sixth accumulator 315, $t_0y_{00}-t_3y_{10}$ is stored in the accumulation register 204 of the seventh accumulator 316, and $t_0y_{00}-t_1y_{10}$ is stored in the accumulation register 204 of the eighth accumulator 317. Further, at the end of the third cycle, the data $y_{20}$ is written in the input register 301 and the result $t_3y_{10}$ of the first multiplier 306 is written in the temporary register 309.

At the fourth cycle, a data $y_{30}$ is supplied from the input terminal, and this data $y_{30}$ is selected by the 2-input selector 305. On the other hand, $t_3$, $t_2$, $t_6$ are read out from the coefficient memories 302 to 304, respectively, and three products $t_3y_{30}$, $t_2y_{20}$, $t_6y_{20}$ are calculated in parallel by the multipliers 306 to 308. Then, one of the results of the second and third multipliers 307,308 is selected by each of the 4-input selectors 201 of the accumulators 310 to 317. In this case, the result $t_2y_{20}$ of the second multiplier 307 is selected in the first, fourth, fifth, eighth accumulators 310, 313, 314, 317, and the result $t_6y_{20}$ of the third multiplier 308 is selected in the second, third, sixth, seventh accumulators 311, 312, 315, 316. The 2's complementer 202 of each of the first, second, seventh and eighth accumulators 310, 311, 316, 317 is arranged such that the output of the corresponding 4-input selector 201 is passed therethrough as it is. The 2's complementer 202 of each of the third to sixth accumulators 312 to 315 is arranged such that the 2' complement of the output of the corresponding 4-input selector 201 is supplied. The adder 203 of each of the accumulators 310 to 317 calculates the sum of the result of the corresponding 2's complementer 202 and the output of the corresponding accumulation register 204, and the addition result is written into the corresponding accumulation register 204. As a result, $t_0y_{00}+t_1y_{10}+t_2y_{20}$ is stored in the accumulation register 204 of the first accumulator 310, $t_0y_{00}+t_3y_{10}+t_6y_{20}$ is stored in the accumulation register 204 of the second accumulator 311. $t_0y_{00}+t_5y_{10}-t_6y_{20}$ is stored in the accumulation register 204 of the third accumulator 312, $t_0y_{00}+t_7y_{10}-t_2y_{20}$ is stored in the accumulation register 204 of the fourth accumulator 313, $t_0y_{00}-t_7y_{10}-t_2y_{20}$ is stored in the accumulation register 204 of the fifth accumulator 314, $t_0y_{00}-t_5y_{10}-t_6y_{20}$ is stored in the accumulation register 204 of the sixth accumulator 315, $t_0y_{00}-t_3y_{10}+t_6y_{20}$ is stored in the accumulation register 204 of the seventh accumulator 316, and $t_0y_{00}-t_1y_{10}+t_2y_{20}$ is stored in the accumulation register 204 of the eighth accumulator 317. Further, at the end of the fourth cycle, the data $y_{30}$ is written in the input register 301 and the result $t_3y_{30}$ of the first multiplier 306 is written in the temporary register 309.

At the fifth cycle, a data $y_{40}$ is supplied from the input terminal. The 2-input selector 305 selects the output data $y_{30}$ of the input register 301. On the other hand, $t_7$, $t_1$, $t_5$ are read out from the coefficient memories 302 to 304, respectively, and three products $t_7y_{30}$, $t_1y_{30}$, $t_5y_{30}$ are calculated in parallel by the multipliers 306 to 308. Then, one of output data of the temporary register 309 and the results of the three multipliers 306,307, 308, is selected by each of the 4-input selectors 201 of the accumulators 310 to 317. In this case, the output data $t_3y_{30}$ of the temporary register 309 is selected in the first accumulator 310, the result $t_7y_{30}$ of the first multiplier 306 is selected in the second accumulator 311, the result $t_1y_{30}$ of the second multiplier 307 is selected in the third accumulator 312, the result $t_5y_{30}$ of the third multiplier 308 is selected in the fourth accumulator 313, the result $t_5y_{30}$ of the third multiplier 308 is selected in the fifth accumulator 314, the result $t_1y_{30}$ of the second multiplier 307 is selected in the sixth accumulator 315, the result $t_7y_{30}$ of the first multiplier 306 is selected in the seventh accumulator 316, and the output data $t_3y_{30}$ of the temporary register 309 is selected in the eighth accumulator 317. The 2's complementer 202 of each of the first, fifth, sixth, seventh accumulators 310, 314, 315, 316 is arranged such that the output of the corresponding 4-input selector 201 is passed therethrough as it is. The 2's complementer 202 of each of the second, third, fourth, eighth accumulators 311, 312,313,317 is arranged to supply the 2's complement of the output of the corresponding 4-input selector 201. The adder 203 of each of the accumulators 310 to 317 calculates the sum of the result of the corresponding 2's complementer 202 and the output of the corresponding accumulation register 204, and the addition result is written into the corresponding accumulation register 204. As a result, $t_0y_{00}+t_1y_{10}+t_2y_{20}+t_3y_{30}$ is stored in the accumulation register 204 of the first accumulator 310, $t_0y_{00}+t_3y_{10}+t_6y_{20}-t_7y_{30}$ is stored in the accumulation register 204 of the second accumulator 311, $t_0y_{00}+t_5y_{10}-t_6y_{20}-t_1y_{30}$ is stored in the accumulation register 204 of the third accumulator 312, $t_0y_{00}+t_7y_{10}-t_2y_{20}-t_5y_{30}$ is stored in the accumulation register 204 of the fourth accumulator 313, $t_0y_{00}-t_7y_{10}t_2y_{20}+t_5y_{30}$ is stored in the accumulation register 204 of the fifth accumulator 314, $t_0y_{00}-t_5y_{10}-t_6y_{20}+t_1y_{30}$ is stored in the accumulation register 204 of the sixth accumulator 315, $t_0y_{00}-t_3y_{10}+t_6y_{20}+t_7y_{30}$ is stored in the accumulation register 204 of the seventh accumulator 316, and $t_0y_{00}-t_1y_{10}+t_2y_{20}-t_3y_{30}$ is stored in the accumulation register 204 of the eighth accumulator 317. Further, at the end of the fifth cycle, the data $y_{40}$ is written in the input register 301 and the result $t_7y_{30}$ of the first multiplier 306 is written in the temporary register 309.

At the sixth to ninth cycles, data $y_{50}$, $y_{60}$, $y_{70}$, $y_{01}$ are successively supplied from the input terminal. Accordingly, at the end of the ninth cycle, eight inner products $w_{00}$, $w_{10}$, $w_{20}$, $w_{30}$, $w_{40}$, $w_{50}$, $w_{60}$, $w_{70}$ are stored in the accumulation registers 204 of the accumulators 310 to 317. Further, at the end of the ninth cycle, the data $y_{01}$ is written in the input register 301 and the result $t_5y_{70}$ of the first multiplier 306 is written in the temporary register 309.

At the tenth cycle, a data $y_{11}$ is supplied from the input terminal. A processing similar to that at the second cycle above-mentioned is executed, and the retention contents $w_{00}$, $w_{10}$, $w_{20}$, $w_{30}$, $w_{40}$, $w_{50}$, $w_{60}$, $w_{70}$ of the accumulation registers 204 of the accumulators 310 to 317, are transferred to the buffer registers 205, respectively. The 8-input selector 318 selectively supplies the output $w_{00}$ of the first accumulator 310.

Then, by repeating operations similar to those above-mentioned, there are continuously obtained output data $w_{00}$ to $w_{70}$, $w_{01}$ to $w_{71}$, . . . , $w_{07}$ to $w_{77}$ corresponding to the input data $y_{00}$ to $y_{70}$, $y_{01}$ to $y_{71}$, ..., $y_{07}$ to $y_{77}$ which are continuously supplied.

As thus discussed, according to the second embodiment, there can be realized a one-dimensional IDCT processor in which the number of multipliers is reduced to 3. Further, when fixed wirings are adopted, the number of inputs of the 4-input selector 201 (See FIGS. 5 and 6) of each of the accumulators 310 to 317, can be reduced to 2. For example, only the result of the second multiplier 307 and the output data of the temporary register 309 are supplied to the first and eighth accumulators 310, 317, only the results of the first and third multipliers 306, 308 are supplied to the second and seventh accumulators 311, 316, and only the results of the second and third multipliers 307, 308 are supplied to the third to sixth accumulators 312 to 315.

Third Embodiment

From the equations (4), it is readily understood that $t_0$ is equal to $t_4$. When this relation is utilized, the equation (2) is modified as follows;

$$\begin{align}
w_{ij} &= d_{i0}y_{0j} + \Sigma_{k=1}^{3} d_{ik}y_{kj} + d_{i4}y_{4j} + \Sigma_{k=5}^{7} d_{ik}y_{kj} \tag{5}\\
&= t_0 y_{0j} + \Sigma_{k=1}^{3} d_{ik}y_{kj} \pm t_0 y_{4j} + \Sigma_{k=5}^{7} d_{ik}y_{kj}\\
&= t_0 y_{0j} \pm t_0 y_{4j} + \Sigma_{k=1}^{3} d_{ik}y_{kj} + \Sigma_{k=5}^{7} d_{ik}y_{kj}\\
&= t_0 y_{0j} \pm t_0 y_{4j} + \omega_{ij}
\end{align}$$

In the equation (5), "$\pm$" is regarded as "+" where i is equal to 0, 3, 4, 7, and as "−" where i is equal to 1, 2, 5, 6 (See FIG. 1). Further, $\omega_{ij}$ in the equation (5) refers to a partial inner product and is expressed as follows;

$$\omega_{ij} = \Omega_{k=1}^{3} d_{ik}y_{kj} + \Omega_{k=5}^{7} d_{ik}y_{kj} \tag{6}$$

According to the equation (6), the matrix operation in FIG. 1 can be reduced in size as shown in FIG. 10.

Figure 11:
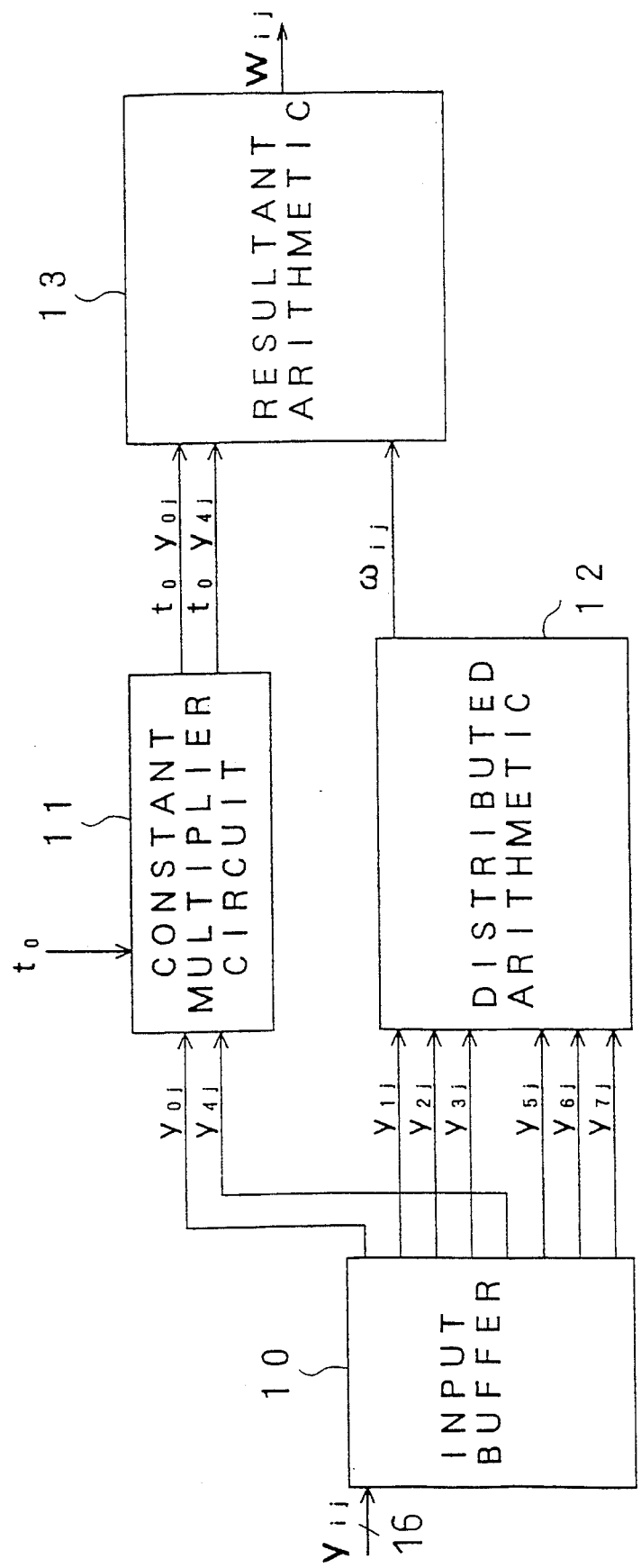
FIG. 11 is a view illustrating the arrangement of an IDCT processor according to a third embodiment of the present invention.

FIG. 11 shows the arrangement of a one-dimensional IDCT processor according to a third embodiment of the present invention. This is arranged to execute the operation of the equation (5). Shown in FIG. 11 are an input buffer 10, a constant multiplier circuit 11, a distributed arithmetic (DA) circuit 12 and a resultant arithmetic (RA) circuit 13. From an input terminal, binary number data $y_{ij}$ (i=0 to 7, j=0 to 7) expressed in terms of 2's complements having a 16-bit length, are supplied to the input buffer 10 in the order of $y_{00}$ to $y_{70}$, $y_{01}$ to $y_{71}$, ..., $y_{07}$ to $y_{77}$. The input buffer 10 supplies data $y_{0j}$, $y_{4j}$ to the constant multiplier circuit 11, and data $y_{1j}$, $y_{2j}$, $y_{3j}$, $y_{5j}$, $y_{6j}$, $y_{7j}$ to the DA circuit 12. The constant multiplier circuit 11 is arranged to do two constant multiplications $t_0 y_{0j}$, $t_0 y_{4j}$. The DA circuit 12 is arranged to execute the matrix operation in FIG. 10 to obtain partial inner products $\omega_{ij}$. The RA circuit 13 is arranged to obtain inner products $w_{ij}$ from $t_0 y_{0j}$, $t_0 y_{4j}$, $\omega_{ij}$ according to the equation (5).

Figure 12:
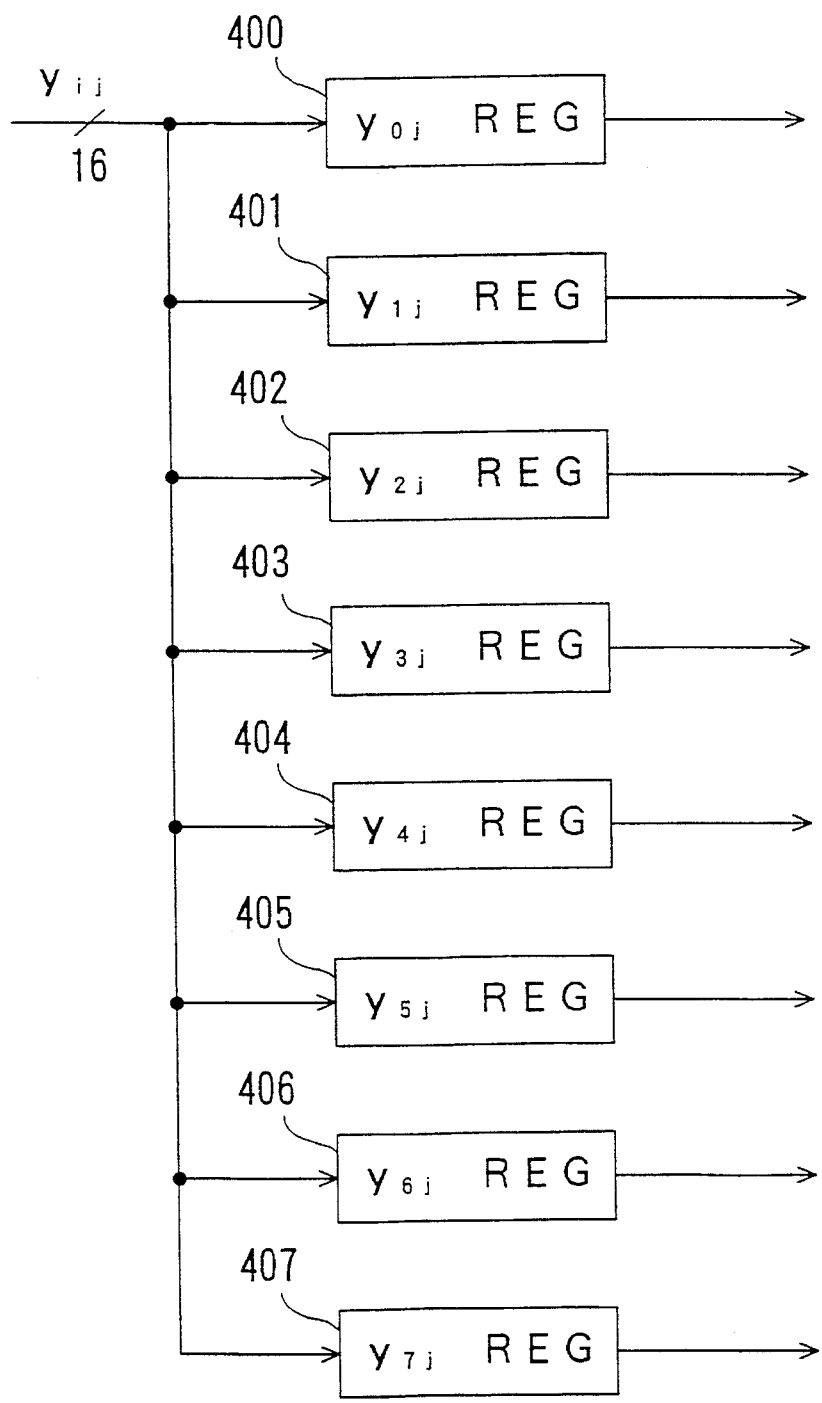
FIG. 12 is a view illustrating the inside arrangement of the input buffer in FIG. 11.

FIG. 12 shows the inside arrangement of the input buffer 10. The input buffer 10 has eight registers 400 to 407 for holding data $y_{0j}$, $y_{1j}$, $y_{2j}$, $y_{3j}$, $y_{4j}$, $y_{5j}$, $y_{6j}$, $y_{7j}$, respectively.

Figure 13:
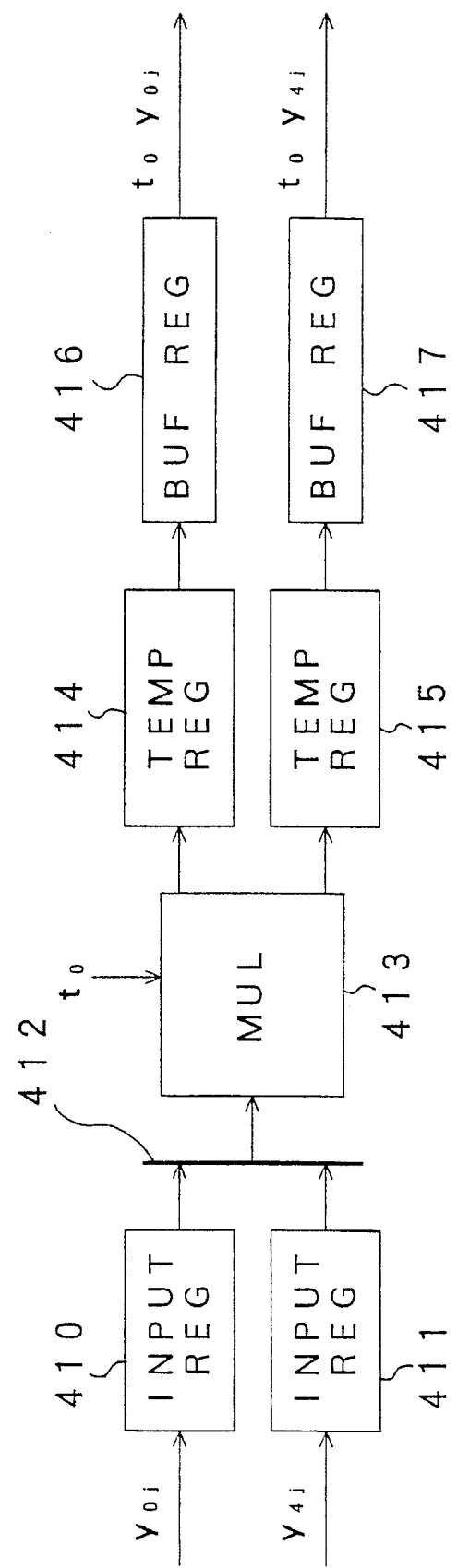
FIG. 13 is a view illustrating the inside arrangement of the constant multiplier circuit in FIG. 11.

FIG. 13 shows the inside arrangement of the constant multiplier circuit 11. The constant multiplier circuit 11 comprises an input register 410 for holding a data $y_{0j}$, an input register 411 for holding a data $y_{4j}$, a 2-input selector 412 for successively selecting two data $y_{0j}$, $y_{4j}$, a multiplier 413 for successively executing two constant multiplications $t_0 y_{0j}$, $t_0 y_{4j}$, a temporary register 414 for holding the product $t_0 y_{0j}$, a temporary register 415 for holding the product $t_0 y_{4j}$, and two buffer registers 416, 417 for holding the outputs of the temporary registers 414, 415 to assure a pipeline operation of the one-dimensional IDCT processor.

Figure 14:
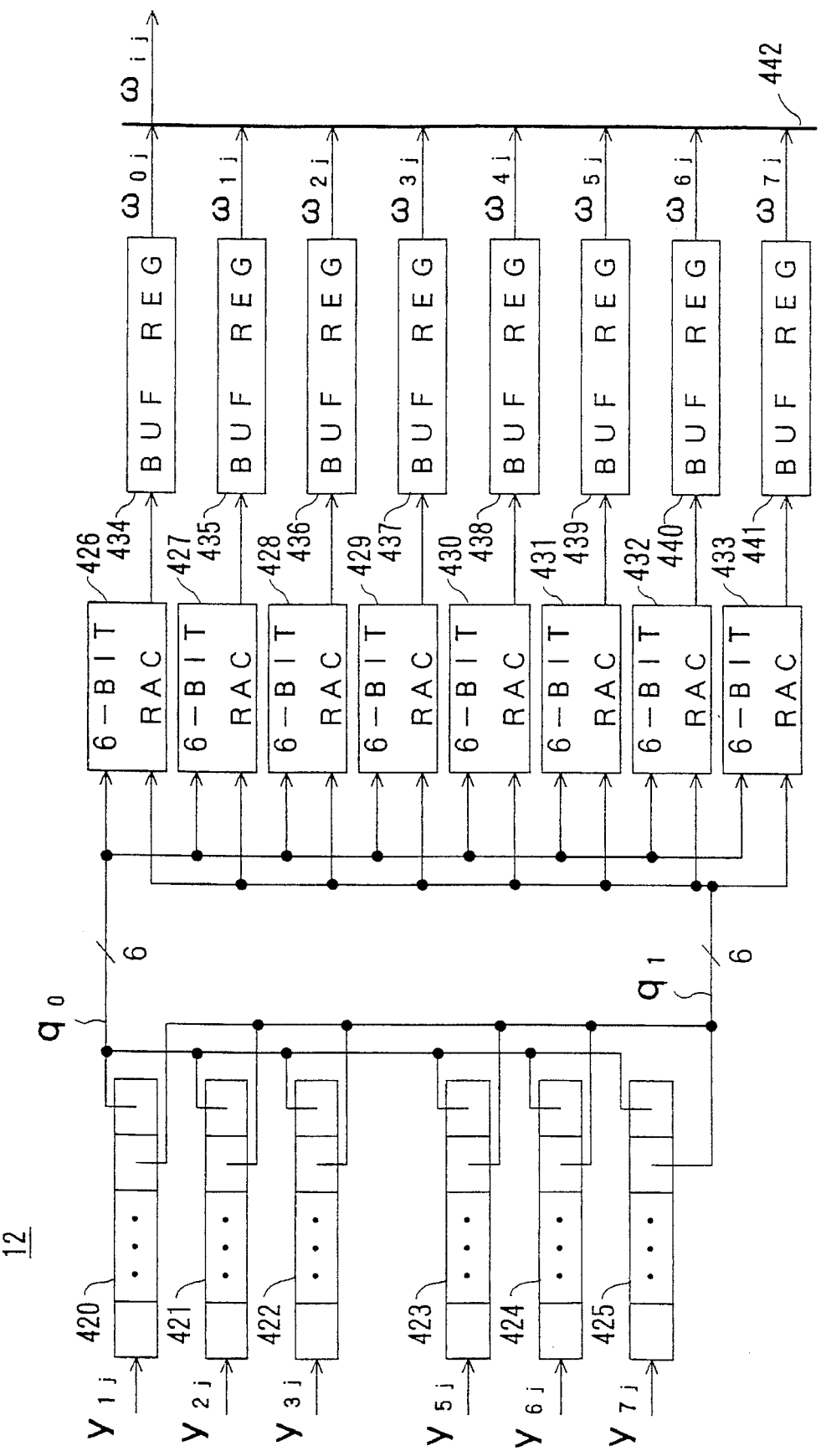
FIG. 14 is a view illustrating the inside arrangement of the distributed arithmetic circuit in FIG. 11.
Figure 15:
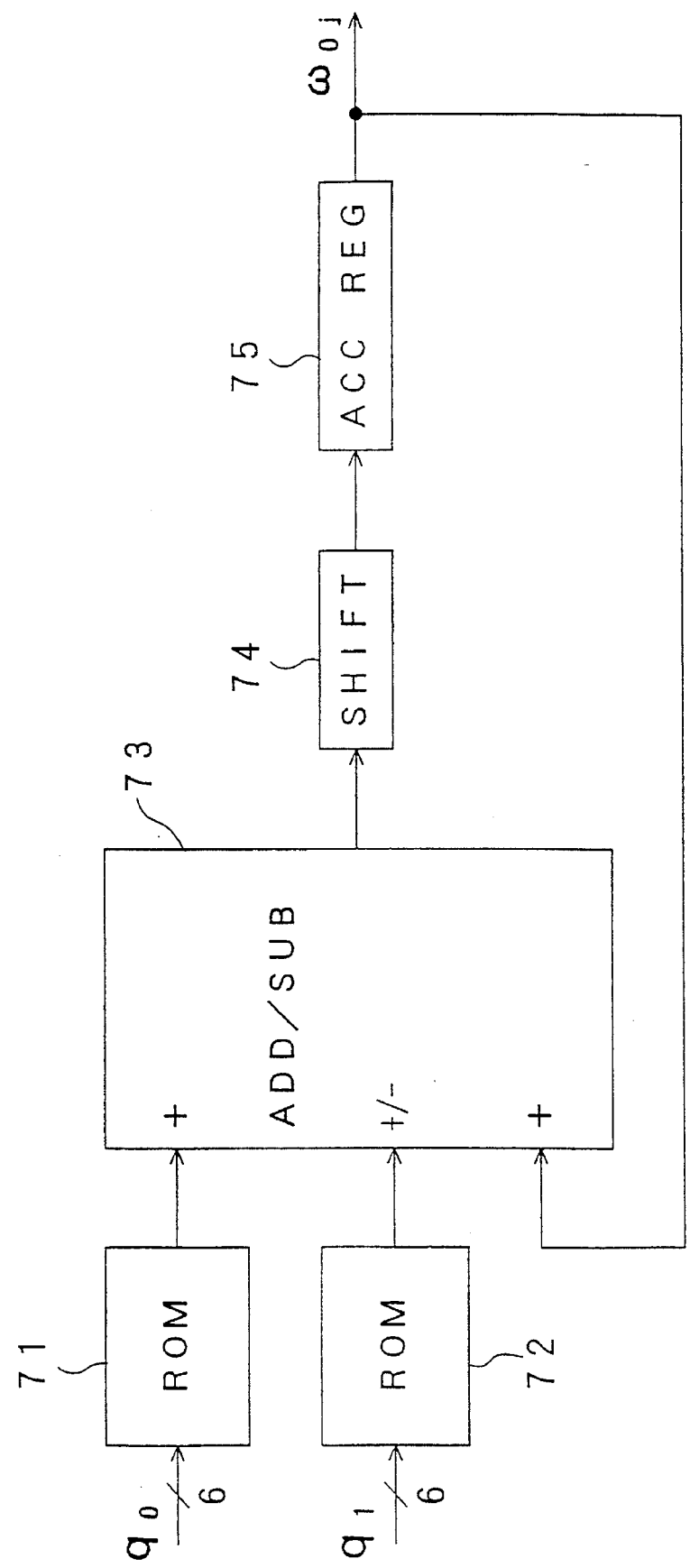
FIG. 15 is a view illustrating the inside arrangement of one of the 6-bit input RACs, shown in FIG. 14, for executing the matrix operation in FIG. 10.

FIG. 14 shows the inside arrangement of the DA circuit 12. The DA circuit 12 comprises six shift registers 420 to 425, eight 6-bit input RACs 426 to 433, eight buffer registers 434 to 441, and an 8-input selector 442. The shift registers 420 to 425 are arranged to hold data $y_{1j}$, $y_{2j}$, $y_{3j}$, $y_{5j}$, $y_{6j}$, $y_{7j}$, respectively, and to successively shift out the least significant two bits thereof. The least significant bits of the shift registers 420 to 425 are supplied, as a first bit slice word $q_0$, to the 6-bit input RACs 426 to 433, and the bits upper by one digit than the least significant bits of the shift registers 420 to 425 are supplied, as a second bit slice word $q_1$, to the 6-bit input RACs 426 to 433. As shown in FIG. 15, the 6-bit input RAC 426 comprises a first ROM 71, a second ROM 72, a 3-input adder/subtracter 73, a shifter 74, and an accumulation register 75. The first ROM 71 is arranged to receive the first bit slice word $q_0$ as an address and to supply, as a first input, a partial sum of the corresponding vector inner product to the 3-input adder/subtracter 73. The second ROM 72 is arranged to receive the second bit slice word $q_1$ as an address and to supply, as a second input, a partial sum of the corresponding vector inner product to the 3-input adder/subtracter 73. The retention output of the accumulation register 75 is supplied, as a third input, to the 3-input adder/subtracter 73. It is noted that the second input has a weight upper by 1 bit than each of the first and third inputs. The retention contents of the accumulation register 75 are previously initialized to 0. The 3-input adder/subtracter 73 is arranged to execute addition of the first to third inputs. However, the 3-input adder/subtracter 73 is arranged to execute subtraction as to the partial sum relating to the last bit slice word $q_1$. The shifter 74 is formed as a left shifter for moving the digits of the result of the 3-input adder/subtracter 73. The retention contents of the accumulation register 75 are rewritten by the output of the shifter 74. Finally, a partial inner product $\omega_{0j}$ is supplied from the accumulation register 75. Each of other 6-bit input RACs in FIG. 14 has an arrangement similar to that shown in FIG. 15. Accordingly, there are obtained, in parallel, eight partial inner products $\omega_{0j}$, $\omega_{1j}$, $\omega_{2j}$, $\omega_{3j}$, $\omega_{4j}$, $\omega_{5j}$, $\omega_{6j}$, $\omega_{7j}$ by the eight 6-bit input RACs 426 to 433. The buffer registers 434 to 441 are arranged to hold the outputs of the 6-bit input RACs 426 to 433 to assure a pipeline operation of the one-dimensional IDCT processor. The 8-input selector 442 is arranged to successively select the retention data of the buffer registers 434 to 441 and to supply the partial inner products $\omega_{ij}$ (i=0 to 7, j=0 to 7) in the order of $\omega_{0j}$, $\omega_{1j}$, $\omega_{2j}$, $\omega_{3j}$, $\omega_{4j}$, $\omega_{5j}$, $\omega_{7j}$.

Figure 16:
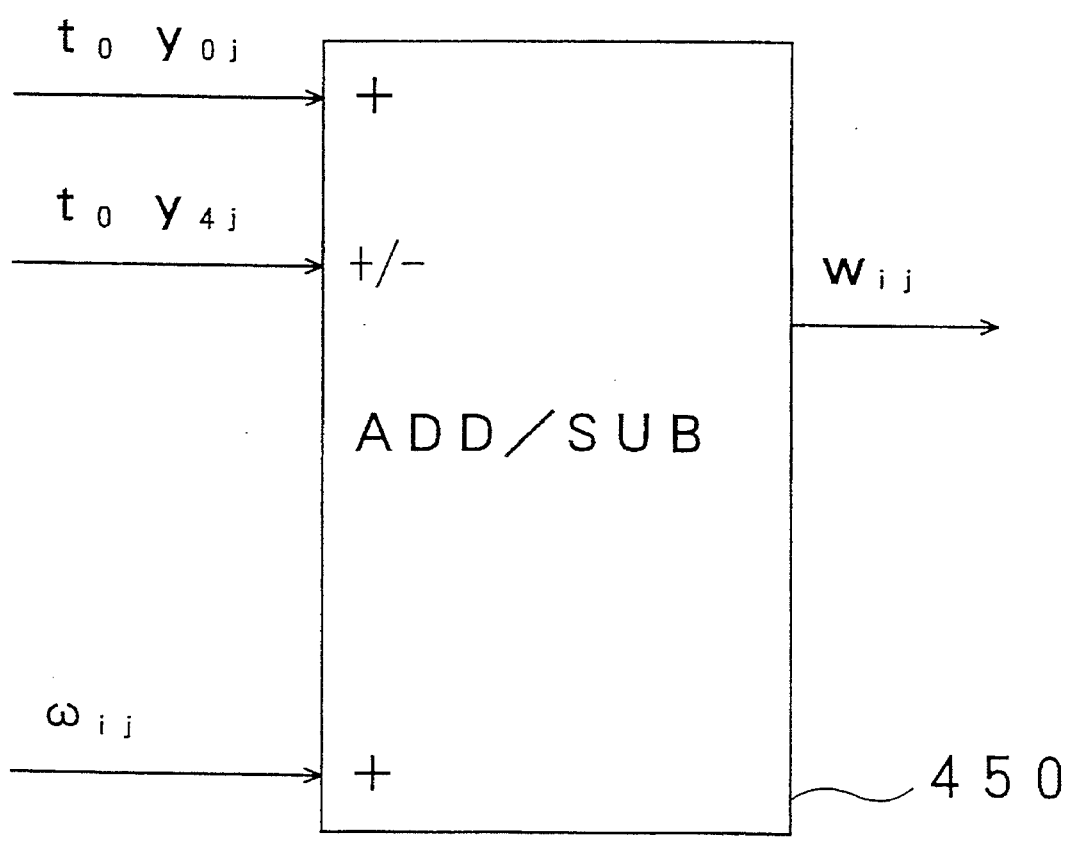
FIG. 16 is a view illustrating the inside arrangement of the resultant arithmetic circuit in FIG. 11.

FIG. 16 shows the inside arrangement of the RA circuit 13. The RA circuit 13 is formed by a 3-input adder/subtracter 450 for executing addition/subtraction between the two products $t_0 y_{0j}$, $t_0 y_{4j}$ supplied from the constant multiplier circuit 11 and the partial inner products $\omega_{ij}$ supplied from the DA circuit 12, thereby to obtain inner products $w_{ij}$. It is noted that, as to the product $t_0 y_{4j}$, addition or subtraction is selected dependent on the value of i according to the equation (5). More specifically, control is made such that addition is selected at the cycle where i is equal to 0, 3, 4, 7 and that subtraction is selected at the cycle where i is equal to 1, 2, 5, 6.

With reference to FIGS. 11 to 16, the following description will discuss the operation of the one-dimensional IDCT processor according to the third embodiment of the present invention.

At the first to eight cycles, eight data $y_{00}$, $y_{10}$, $y_{20}$, $y_{30}$, $y_{40}$, $y_{50}$, $y_{60}$, $y_{70}$ are respectively supplied from the input terminal. These data are respectively stored in the registers 400 to 407.

At the ninth cycle, the data of the input buffer 10 is transferred to the constant multiplier circuit 11 and the DA circuit 12. More specifically, the data $y_{00}$, $y_{40}$ are stored in the input registers 410, 411 of the constant multiplier circuit 11, and the data $y_{10}$, $y_{20}$, $y_{30}$, $y_{50}$, $y_{60}$, $y_{70}$ are stored in the shift registers 420 to 425 of the DA circuit 12.

At the 10th to 13th cycles, the data $y_{00}$ is selected by the 2-input selector 412 of the constant multiplier circuit 11, constant multiplication $t_0 y_{00}$ is executed by the multiplier 413, and the result of this constant multiplication is written into the temporary register 414. At the 14th to 17th cycles, the data $y_{40}$ is selected by the 2-input selector 412, constant multiplication $t_0 y_{40}$ is executed by the multiplier 413, and the result of this constant multiplication is written into the temporary register 415. On the other hand, at the 10th to 17th cycles, eight partial inner products $\omega_{00}$, $\omega_{10}$, $\omega_{20}$, $\omega_{30}$, $\omega_{40}$, $\omega_{50}$, $\omega_{60}$, $\omega_{70}$ are obtained by the 6-bit input RACs 426 to 433 in the DA circuit At the 18th cycle, the retention data of the temporary registers 414,415 of the constant multiplier circuit 11 are transferred to the buffer registers 416,417, and the output data of the 6-bit input RACs 426 to 433 of the DA circuit 12 are transferred to the buffer registers 434 to 441.

At the 19th to 26th cycles, the 8-input selector 442 of the DA circuit 12 successively supplies the partial inner products $\omega_{00}$, $\omega_{10}$, $\omega_{20}$, $\omega_{30}$, $\omega_{40}$, $\omega_{50}$, $\omega_{60}$, $\omega_{70}$ to the RA circuit 13. On the other hand, the products $t_0 y_{00}$, $t_0 y_{40}$ are supplied from the constant multiplier circuit 11 to the RA circuit 13. The 3-input adder/subtracter 450 of the RA circuit 11 successively supplies the inner products $w_{00}$, $w_{10}$, $w_{20}$, $w_{30}$, $w_{40}$, $w_{50}$, $w_{60}$, $w_{70}$ according to the equation (5).

Processings as to the next eight data $y_{01}$, $y_{11}$, $y_{21}$, $y_{31}$, $y_{41}$, $y_{51}$, $y_{61}$, $y_{71}$ will be executed at the 9th to 34th cycles in manners similar to those of the processings at the first to 26th cycles. As a result, inner products $w_{01}$, $w_{11}$, $w_{21}$, $w_{31}$, $w_{41}$, $w_{51}$, $w_{61}$, $w_{71}$ are successively supplied at the 27th to 34th cycles.

Then, by repeating operations similar to those above-mentioned, there are continuously obtained output data $w_{00}$ to $w_{70}$, $w_{01}$ to $w_{71}$, ..., $w_{07}$ to $w_{77}$ corresponding to the input data $y_{00}$ to $y_{70}$, $y_{01}$ to $y_{71}$, ..., $y_{07}$ to $y_{77}$ which are continuously supplied.

As thus discussed, according to the third embodiment, there can be realized a one-dimensional IDCT processor in which the number of multipliers is reduced to 1. Further, the multiplier 413 in the constant multiplier circuit 11 is reduced in circuit size as compared with a 2-variable input multiplier. Further, since a portion of the inner-product calculation is executed by the constant multiplier circuit 11, the DA circuit 12 is reduced in ROM size.

The following description will discuss a modification of the third embodiment. The equation (5) is modified as follows;

$$w_{ij} = t_0 (y_{0j} \pm y_{4j}) + \omega_{ij} \qquad (7)$$

In the equation (7), "±" is regarded as "+" where i is equal to 0, 3, 4, 7, and as "−" where i is equal to 1, 2, 5, 6 (See FIG. 1). The constant multiplier circuit 11 in FIG. 17 and the RA circuit 13 in FIG. 18 adopt the operational procedure of the equation (7).

Figure 17:
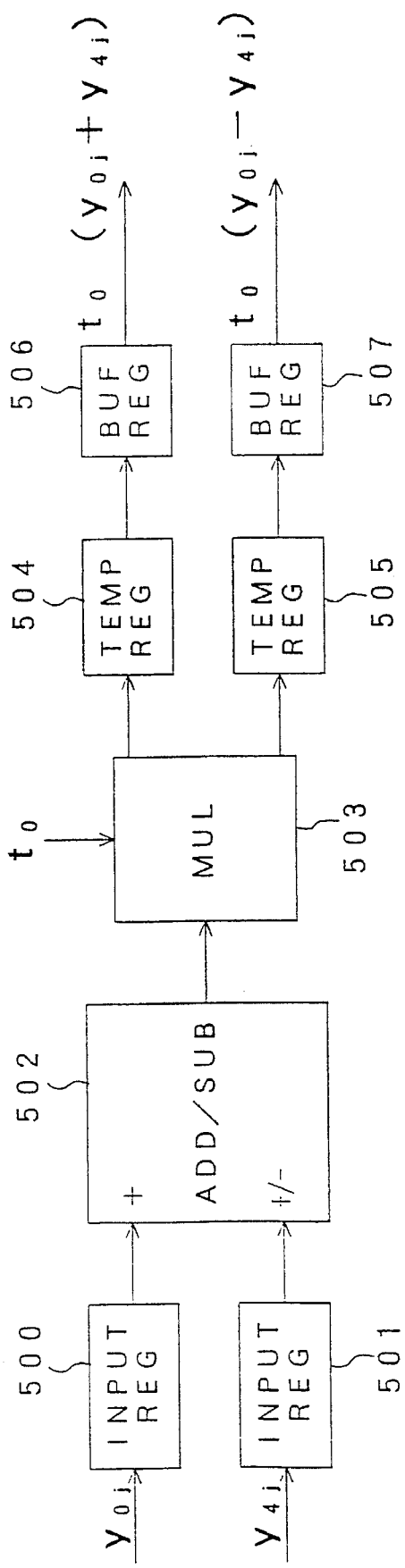
FIG. 17 is a view of a modification of the constant multiplier circuit in FIG. 13.

The constant multiplier circuit 11 shown in FIG. 17 comprises an input register 500 for holding a data $y_{0j}$, an input register 501 for holding a data $y_{4j}$, a 2-input adder/subtracter 502 for successively executing addition $y_{0j} + y_{4j}$ and subtraction $y_{0j} - y_{4j}$, a multiplier 503 for successively executing two constant multiplications $t_0(y_{0j}+y_{4j})$, $t_0(y_{0j}-y_{4j})$, a temporary register 504 for holding the product $t_0(y_{0j}+y_{4j})$, a temporary register 505 for holding the product $t_0(y_{0j}-y_{4j})$, and two buffer registers 506, 507 for holding the outputs of the temporary registers 504, 505, respectively.

Figure 18:
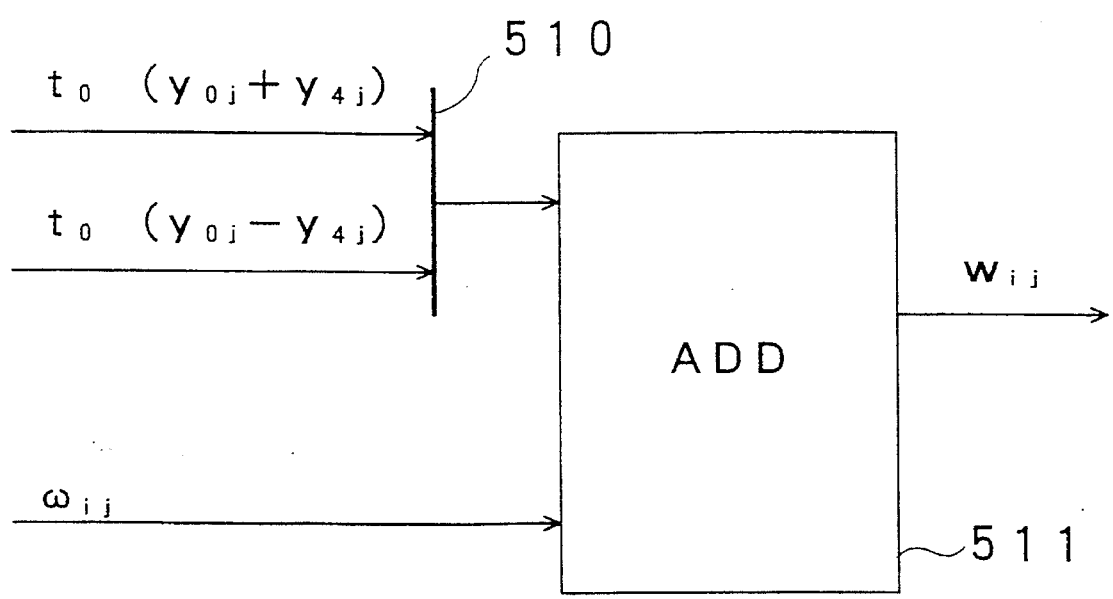
FIG. 18 is a view illustrating the inside arrangement of the resultant arithmetic circuit in the IDCT processor employing the constant multiplier circuit in FIG. 17.

When the constant multiplier circuit 11 in FIG. 17 is used, the RA circuit 13 in FIG. 16 is modified as shown in FIG. 18. The RA circuit 13 in FIG. 18 comprises a 2-input selector 510 for selecting one of the two products $t_0(y_{0j}+y_{4j})$, $t_0(y_{0j}-y_{4j})$ supplied from the constant multiplier circuit 11, and a 2-input adder 511 for executing addition of the product selected by the 2-input selector 510 and the partial inner products $\omega_{ij}$ supplied from the DA circuit 12, thereby to obtain inner products $w_{ij}$. The 2-input selector 510 is controlled such that according to the equation (7), $t_0(y_{0j}+y_{4j})$ is selected at the cycle where i is equal to 0, 3, 4, 7, and $t_0(y_{0j}-y_{4j})$ is selected at the cycle where i is equal to 1, 2, 5, 6.

The matrix operation in FIG. 10 is modified as shown in FIG. 19. The half of the elements of the matrix in 8 rows and 6 columns in FIG. 19, is equal to 0. Accordingly, the matrix operation in FIG. 19 is divided into two portions as shown in FIG. 20A and FIG. 20B. Four partial inner products $\rho_{0j}$, $\rho_{1j}$, $\rho_{2j}$, $\rho_{3j}$ in FIG. 20A can be obtained by four 2-bit input RACs, and four partial inner products $\sigma_{0j}$, $\sigma_{1j}$, $\sigma_{2j}$, $\sigma_{3j}$ in FIG. 20B can be obtained by four 4-bit input RACs. The following is understood from FIG. 20A and FIG. 20B;

$$\omega_{0j} = \rho_{0j} + \sigma_{0j}$$
$$\omega_{1j} = \rho_{1j} + \sigma_{1j}$$
$$\omega_{2j} = \rho_{2j} + \sigma_{2j}$$
$$\omega_{3j} = \rho_{3j} + \sigma_{3j}$$
$$\omega_{4j} = \rho_{4j} + \sigma_{3j}$$
$$\omega_{5j} = \rho_{3j} + \sigma_{2j}$$
$$\omega_{6j} = \rho_{1j} + \sigma_{1j}$$
$$\omega_{7j} = \rho_{0j} + \sigma_{0j} \qquad (8)$$

Figure 21:
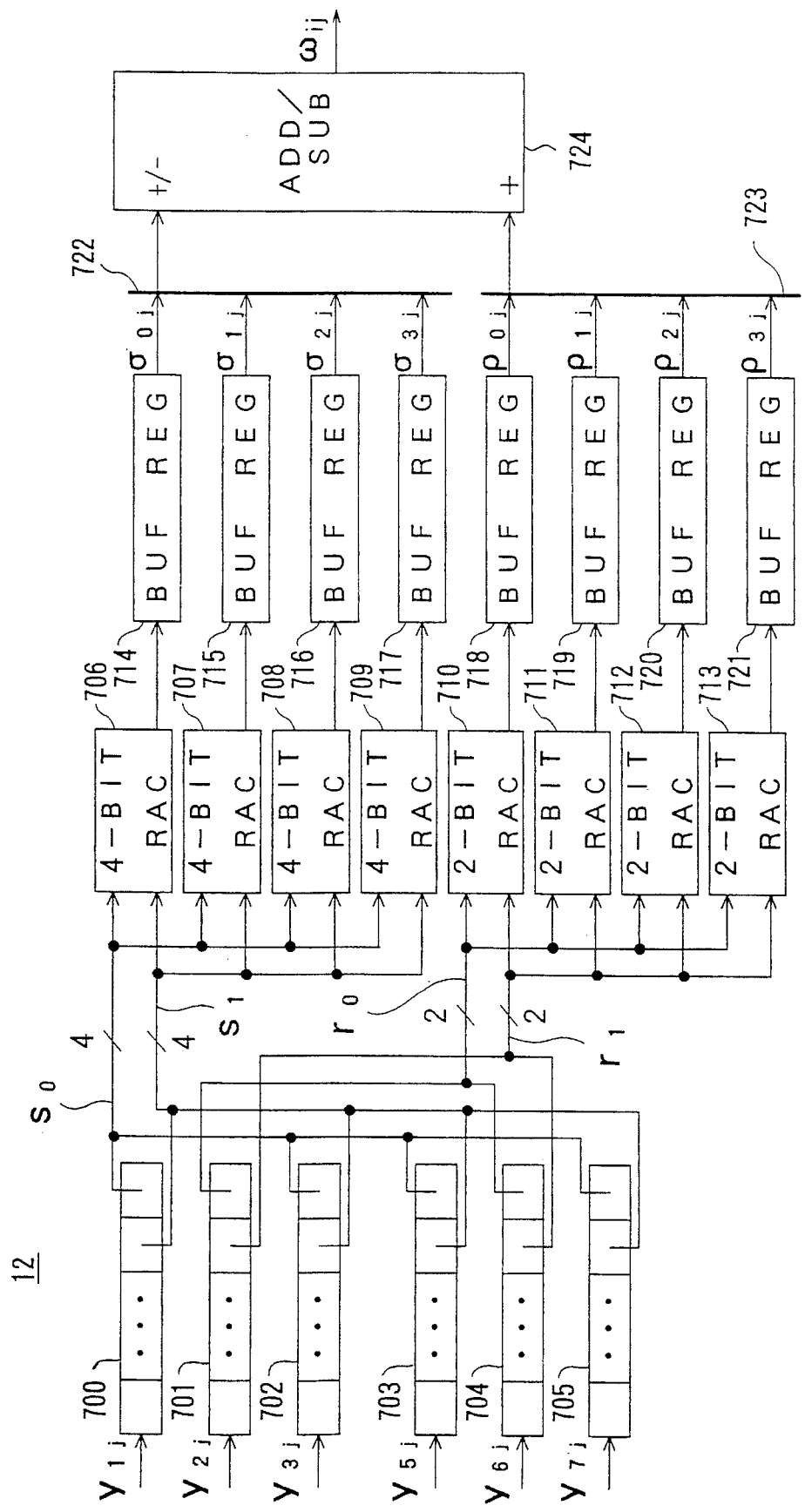
FIG. 21 is a view of a modification of the distributed arithmetic circuit in FIG. 14.

A DA circuit 12 in FIG. 21 is arranged such that the matrix operations in FIG. 20A and FIG. 20B are executed by the RACs and the partial inner products $\omega_{ij}$ are obtained using the equations (8).

Figure 22:
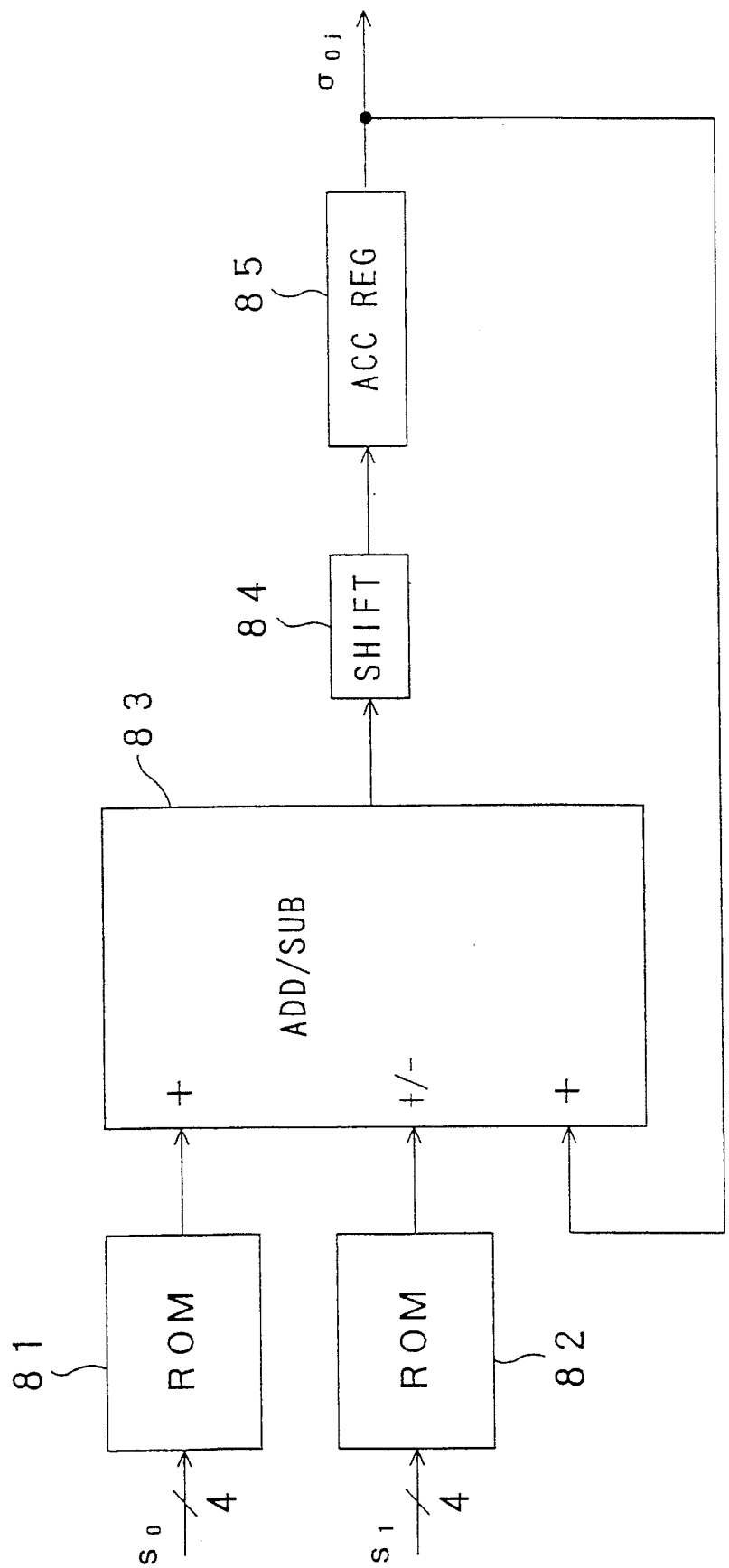
FIG. 22 is a view illustrating the inside arrangement of one of the 4-bit input RACs, shown in FIG. 21, for executing the matrix operation in FIG. 20B.

The DA circuit 12 in FIG. 21 comprises six shift registers 700 to 705, four 4-bit input RACs 706 to 709, four 2-bit input RACs 710 to 713, eight buffer registers 714 to 721, a first 4-input selector 722, a second 4-input selector 723 and a 2-input adder/subtracter 724. The shift registers 700 to 705 are arranged to hold data $y_{1j}$, $y_{2j}$, $y_{3j}$, $y_{5j}$, $y_{6j}$, $y_{7j}$ and to shift out the least significant two bits thereof. The least significant bits of the four shift registers 700, 702, 703, 705 are supplied, as a first bit slice word $s_0$, to the 4-bit input RACs 706 to 709, and the bits upper by one digit than the least significant bits of the shift registers 700, 702, 703, 705 are supplied, as a second bit slice word $s_1$, to the 4-bit input RACs 706 to 709. The least significant bits of the two shift registers 701, 704 are supplied, as a third bit slice word $r_0$, to the 2-bit input RACs 710 to 713, and the bits upper by one digit than the least significant bits of the shift registers 701, 704 are supplied, as a fourth bit slice word $r_1$, to the 2-bit input RACs 710 to 713. As shown in FIG. 22, the 4-bit input RAC 706 comprises a first ROM 81, a second ROM 82, a 3-input adder/subtracter 83, a shifter 84, and an accumulation register 85. Each of other 4-bit input RACs in FIG. 21 has an arrangement similar to that in FIG. 22. Accordingly, four partial inner products $\sigma_{0j}, \sigma_{1j}, \sigma_{2j}, \sigma_{3j}$ can be obtained, in parallel, by the four 4-bit input RACs 706 to 709. As shown in FIG. 23, the 2-bit input RAC 710 comprises a first ROM 91, a second ROM 92, a 3-input adder/subtracter 93, a shifter 94, and an accumulation register 95. Each of other 2-bit input RACs in FIG. 21 has an arrangement similar to that in FIG. 23. Accordingly, four partial inner products $\rho_{0j}, \rho_{1j}, \rho_{2j}, \rho_{3j}$ can be obtained, in parallel, by the four 2-bit input RACs 710 to 713. The buffer registers 714 to 721 are arranged to hold the outputs of the eight RACs 706 to 713 to assure a pipeline operation of the one-dimensional IDCT processor. The first 4-input selector 722 is arranged to select the retention data of the buffer registers 714 to 717 to successively supply the partial inner products $\sigma_{0j}, \sigma_{1j}, \sigma_{2j}, \rho_{3j}, \sigma_{2j}, \sigma_{1j}, \sigma_{0j}$ to the 2-input adder/subtracter 724. The second 4-input selector 723 is arranged to select the retention data of the buffer registers 718 to 721 to successively supply the partial inner products $\rho_{0j}, \rho_{1j}, \rho_{2j}, \rho_{3j}, \rho_{2j}, \rho_{1j}, \rho_{0j}$ to the 2-input adder/subtracter 724. The 2-input adder/subtracter 724 is arranged to execute addition and subtraction according to the equations (8). More specifically, the partial inner products $\omega_{ij}$ (i=0 to 7, j=0 to 7) are supplied from the 2-input adder/subtracter 724 in the order of $\omega_{0j}, \omega_{1j}, \omega_{2j}, \omega_{3j}, \omega_{4j}, \omega_{5j}, \omega_{6j}, \omega_{7j}$.

The inside arrangements of the constant multiplier circuit 11 and the RA circuit 13 in FIG. 11 may suitably be selected from the combination of FIG. 13 with FIG. 16, the combination of FIG. 17 with FIG. 18, and the like. Further, the inside arrangement of the DA circuit 12 in FIG. 11 may suitably be selected from the arrangement in FIG. 14, the arrangement in FIG. 21 and the like.

In each of the first to third embodiments, the description has been made on an 8-point IDCT processing. However, each embodiment may readily be modified for a 16-point IDCT processing, an 8-point IDST processing, a 16-point IDST processing or the like.

What is claimed is:

1. An orthogonal transform processor for executing an orthogonal transform processing on an input data consisting of $2^{n+1}$ (n is an integer of 2 or more) elements, comprising;

first to $2^n$th coefficient memories each for storing $2^{n+1}$ absolute values of $2^n \times 2^{n+1}$ coefficients out of $2^{n+1} \times 2^{n+1}$ coefficients forming an orthogonal transform matrix;

first to $2^n$th multipliers each for executing multiplication of one element of said input data by one of the $2^{n+1}$ absolute values of coefficients stored in the corresponding coefficient memory out of said first to $2^n$th coefficient memories;

first to $2^{n+1}$th accumulators for executing accumulation using results of said first to $2^n$th multipliers while restoring signs of the coefficients of said orthogonal transform matrix, thereby to obtain, in parallel, $2^{n+1}$ inner products corresponding to said orthogonal transform matrix; and a $2^{n+1}$-input selector for successively selectively supplying results of said first to $2^{n+1}$th accumulators as elements of an output data of said orthogonal transform processor.

2. An orthogonal transform processor according to claim 1, wherein n is equal to 2.

3. An orthogonal transform processor according to claim 2, wherein each of said first to eighth accumulators comprises:

a 2's complementer for selectively supplying either the result itself of one multiplier out of said first to fourth multipliers, or a 2's complement of the result;

an adder for executing addition of an output of said 2's complementer and an accumulation result;

an accumulation register in which 0 is used as an initial value of said accumulation result and which is arranged to hold and supply a result of said adder as an intermediate value of said accumulation result; and a buffer register for holding and supplying an output of said accumulation register.

4. An orthogonal transform processor according to claim 3, wherein each of said first to eighth accumulators further comprises a 4-input selector for selectively supplying, as an input for said 2's complementer, the result of one of said first to fourth multipliers.

5. An orthogonal transform processor according to claim 2, wherein each of said first to eighth accumulators comprises:

a 1's complementer for selectively supplying either the result itself of one multiplier out of said first to fourth multipliers, or a 1's complement of the result;

an adder for executing addition of an output of said 1's complementer and an accumulation result;

an accumulation register in which a constant is used as an initial value of said accumulation result and which is arranged to hold and supply a result of said adder as an intermediate value of said accumulation result; and a buffer register for holding and supplying an output of said accumulation register.

6. An orthogonal transform processor according to claim 5, wherein each of said first to eighth accumulators further comprises a 4-input selector for selectively supplying, as an input for said 1's complementer, the result of one of said first to fourth multipliers.

7. An orthogonal transform processor for executing an orthogonal transform processing on an input data consisting of $2^{n+1}$ (n is an integer of 2 or more) elements, comprising;

first to $(2^n-1)$th coefficient memories each for storing $2^{n+1}$ absolute values of $(2^n-1) \times 2^{n+1}$ coefficients out of $2^{n+1} \times 2^{n+1}$ coefficients forming an orthogonal transform matrix;

an input register for holding and supplying, one by one, the elements of said input data entered as an input;

a 2-input selector for selectively supplying either the input or output of said input register;

a first multiplier for executing multiplication of an output of said 2-input selector by one of the $2^{n+1}$ absolute values of coefficients stored in said first coefficient memory;

second to $(2^n-1)$th multipliers each for executing multiplication of the output of said input register by one of the $2^{n+1}$ absolute values of coefficients stored in the corresponding coefficient memory out of said second to $(2^n-1)$th coefficient memories;

a temporary register for holding and supplying a result of said first multiplier;

first to $2^{n+1}$th accumulators for executing accumulation using (i) results of said first to $(2^n-1)$th multipliers and (ii) an output of said temporary register while restoring signs of the coefficients of said orthogonal transform matrix, thereby to obtain, in parallel, $2^{n+1}$ inner products corresponding to said orthogonal transform matrix; and a $2^{n+1}$-input selector for successively selectively supplying results of said first to $2^{n+1}$th accumulators as elements off an output data of said orthogonal transform processor.

8. An orthogonal transform processor according to claim 7, wherein n is equal to 2.

9. An orthogonal transform processor according to claim 8, wherein each of said first to eighth accumulators comprises:
- a 4-input selector for selectively supplying one of the results of said first to third multipliers and the output of said temporary register;
- a 2's complementer for selectively supplying either an output itself of said 4-input selector, or a 2's complement of the output;
- an adder for executing addition of an output of said 2's complementer and an accumulation result;
- an accumulation register in which 0 is used as an initial value of said accumulation result and which is arranged to hold and supply a result of said adder as an intermediate value of said accumulation result; and
- a buffer register for holding and supplying an output of said accumulation register.

10. An orthogonal transform processor according to claim 8, wherein each of said first to eighth accumulators comprises:
- a 4-input selector for selectively supplying one of the results of said first to third multipliers and the output of said temporary register;
- a 1's complementer for selectively supplying either an output itself of said 4-input selector, or a 1's complement of the output;
- an adder for executing addition of an output of said 1's complementer and an accumulation result;
- an accumulation register in which a constant is used as an initial value of said accumulation result and which is arranged to hold and supply a result of said adder as an intermediate value of said accumulation result; and
- a buffer register for holding and supplying an output of said accumulation register.

11. An orthogonal transform processor for executing an orthogonal transform processing on an input data consisting of $2^{n+1}$ (n is an integer of 2 or more) elements, comprising;
- an input buffer for collectively holding and supplying $2^{n+1}$ continuous elements of said input data;
- a constant multiplier circuit for receiving, from said input buffer, the first and $(2^n+1)$th elements out of said $2^{n+1}$ elements, thereby to supply, in parallel, two results of constant multiplication;
- a distributed arithmetic circuit for receiving other $(2^{n+1}-2)$ elements from said input buffer, thereby to successively supply $2^{n+1}$ partial inner products corresponding to an orthogonal transform matrix and
- a resultant arithmetic circuit for executing a resultant arithmetic between two outputs of said constant multiplier circuit and an output of said distributed arithmetic circuit, thereby to obtain elements of an output data of said orthogonal transform processor.

12. An orthogonal transform processor according to claim 11, wherein n is equal to 2.

13. An orthogonal transform processor according to claim 12, wherein said input buffer has eight registers for respectively holding and supplying the eight continuous elements of said input data.

14. An orthogonal transform processor according to claim 12, wherein
said constant multiplier circuit comprises:
- a first input register for holding and supplying a first element out of said eight continuous elements of said input data;
- a second input register for holding and supplying a fifth element out of said eight continuous elements of said input data;
- a 2-input selector for successively selecting an output of said first input register and an output of said second input register;
- a multiplier for successively executing, with the use of outputs of said 2-input selector, first constant multiplication of the output of said first input register and second constant multiplication of the output of said second input register;
- a first temporary register for holding and supplying a result of said first constant multiplication;
- a second temporary register For holding and supplying a result of said second constant multiplication;
- a first buffer register for holding and supplying an output of said First temporary register; and
- a second buffer register for holding and supplying an output of said second temporary register; and
said resultant arithmetic circuit comprises a 3-input adder/subtracter for executing addition and subtraction with (i) each of an output of said first buffer register and the output of said distributed arithmetic circuit serving as an addition input, and (ii) an output of said second buffer register serving as an addition/subtraction input.

15. An orthogonal transform processor according to claim 12, wherein
said constant multiplier circuit comprises:
- a first input register for holding and supplying a first element out of said eight continuous elements of said input data;
- a second input register for holding and supplying a fifth element out of said eight continuous elements of said input data;
- a 2-input adder/subtracter for successively executing addition and subtraction of an output of said first input register and an output of said second input register;
- a multiplier for successively executing first constant multiplication of an addition result of said 2-input adder/subtracter, and second constant multiplication of a subtraction result of said 2-input adder/subtracter;
- a first temporary register for holding and supplying a result of said first constant multiplication;
- a second temporary register for holding and supplying a result of said second constant multiplication;
- a first buffer register for holding and supplying an output of said first temporary register; and
- a second buffer register for holding and supplying an output of said second temporary register; and
said resultant arithmetic circuit comprises:
- a 2-input selector for selectively supplying either an output of said first buffer register or an output of said second buffer register; and
- a 2-input adder for executing addition of an output of said 2-input selector and the output of said distributed arithmetic circuit.

16. An orthogonal transform processor according to claim 12, wherein said distributed arithmetic circuit comprises:
- six shift registers for holding second, third, fourth, sixth, seventh and eighth elements out of said eight continuous elements of said input data and for successively shifting out least significant two bits of each of said six elements such that the respective least significant bits of said six elements are collected to form a first bit slice word and that the respective bits upper by one digit than said least significant bits of said six elements are collected to form a second bit slice word;

eight 6-bit input RACs for executing a product-sum operation based on said first and second bit slice words such that eight partial inner products corresponding to said orthogonal transform matrix are obtained in parallel;

eight buffer registers for holding and supplying results of said eight 6-bit input RACs; and an 8-input selector for successively selectively supplying outputs of said eight buffer registers.

17. An orthogonal transform processor according to claim 16, wherein each of said eight 6-bit input RACs comprises:

a first ROM for storing partial sums of vector inner products based on said orthogonal transform matrix which is retrieved by said first bit slice word as an address;

a second ROM for storing partial sums of vector inner products based on said orthogonal transform matrix which is retrieved by said second bit slice word as an address;

a 3-input adder/subtracter for receiving (i) a partial sum retrieved from said first ROM as a first addition input, (ii) a partial sum retrieved from said second ROM as an addition/subtraction input, and (iii) an accumulation result as a second addition input;

a shifter for left-shifting and supplying a result of said 3-input adder/subtracter; and an accumulation register in which 0 is used as an initial value of said accumulation result and which is arranged to hold and supply an output of said shifter as an intermediate value of said accumulation result.

18. An orthogonal transform processor according to claim 12, wherein said distributed arithmetic circuit comprises:

four shift registers for holding second, fourth, sixth and eighth elements out of said eight continuous elements of said input data and for successively shifting out least significant two bits of each of said four elements such that the respective least significant bits of said four elements are collected to form a first bit slice word and that the respective bits upper by one digit than said least significant bits of said four elements are collected to form a second bit slice word;

two shift registers for holding third and seventh elements out of said eight continuous elements of said input data and for successively shifting out least significant two bits of each of said two elements such that the respective least significant bits of said two elements are collected to form a third bit slice word and that the respective bits upper by one digit than said least significant bits of said two elements are collected to form a fourth bit slice word;

four 4-bit input RACs for executing a product-sum operation based on said first and second bit slice words such that four partial inner products corresponding to said orthogonal transform matrix are obtained in parallel;

four 2-bit input RACs for executing a product-sum operation based on said third and fourth bit slice words such that Four partial inner products corresponding to said orthogonal transform matrix are obtained in parallel;

first to fourth buffer registers for holding and supplying results of said four 4-bit input RACs;

fifth to eighth buffer registers for holding and supplying results of said four 2-bit input RACs;

a first 4-input selector for successively selectively supplying outputs of said first to fourth buffer registers;

a second 4-input selector for successively selectively supplying outputs of said fifth to eighth buffer registers; and a 2-input adder/subtracter for executing addition and subtraction in which each of outputs of said first 4-input selector serves as an addition/subtraction input and in which each of outputs of said second 4-input selector serves as an addition input.

19. An orthogonal transform processor according to claim 18, wherein each of said four 4-bit input RACs comprises:

a first ROM for storing partial sums of vector inner products based on said orthogonal transform matrix which is retrieved by said first bit slice word as an address;

a second ROM for storing partial sums of vector inner products based on said orthogonal transform matrix which is retrieved by said second bit slice word as an address;

a 3-input adder/subtracter for receiving (i) a partial sum retrieved from said first ROM as a first addition input, (ii) a partial sum retrieved from said second ROM as an addition/subtraction input, and (iii) an accumulation result as a second addition input;

a shifter for left-shifting and supplying a result of said 3-input adder/subtracter; and an accumulation register in which 0 is used as an initial value of said accumulation result and which is arranged to hold and supply an output of said shifter as an intermediate value of said accumulation result.

20. An orthogonal transform processor according to claim 18, wherein each of said four 2-bit input RACs comprises:

a first ROM for storing partial sums of vector inner products based on said orthogonal transform matrix which is retrieved by said third bit slice word as an address;

a second ROM for storing partial sums of vector inner products based on said orthogonal transform matrix which is retrieved by said fourth bit slice word as an address;

a 3-input adder/subtracter for receiving (i) a partial sum retrieved from said first ROM as a first addition input, (ii) a partial sum retrieved from said second ROM as an addition/subtraction input, and (iii) an accumulation result as a second addition input;

a shifter for left-shifting and supplying a result of said 3-input adder/subtracter; and an accumulation register in which 0 is used as an initial value of said accumulation result and which is arranged to hold and supply an output of said shifter as an intermediate value of said accumulation result.

* * * * *